United States Patent
Uematsu et al.

(10) Patent No.: US 8,976,357 B2
(45) Date of Patent: Mar. 10, 2015

(54) OPTICAL SENSOR AND ELECTRONIC APPARATUS UTILIZING AN ANGLE LIMITING FILTER

(75) Inventors: Akira Uematsu, Suwa (JP); Yoshiyuki Terashima, Matsumoto (JP); Yoichi Sato, Suwa (JP); Atsushi Matsuo, Tachikawa (JP)

(73) Assignee: Seiko Epson Corporation, Tokyo (JP)

( * ) Notice: Subject to any disclaimer, the term of this patent is extended or adjusted under 35 U.S.C. 154(b) by 294 days.

(21) Appl. No.: 13/421,583

(22) Filed: Mar. 15, 2012

(65) Prior Publication Data

US 2012/0236297 A1    Sep. 20, 2012

(30) Foreign Application Priority Data

Mar. 16, 2011   (JP) ................. 2011-058181

(51) Int. Cl.
*G01N 21/25* (2006.01)
*G01J 1/06* (2006.01)
*G01J 3/26* (2006.01)
*G01J 3/36* (2006.01)
*G01J 1/04* (2006.01)
*G01J 3/51* (2006.01)
*G01J 3/12* (2006.01)

(52) U.S. Cl.
CPC ............. *G01J 1/06* (2013.01); *G01J 1/0488* (2013.01); *G01J 3/26* (2013.01); *G01J 3/36* (2013.01); *G01J 3/513* (2013.01); *G01J 2003/1213* (2013.01)
USPC .......................... 356/416; 359/885

(58) Field of Classification Search
CPC ............. G01J 1/06; G01J 3/36; G01J 1/0488; G01J 2003/1213; G01J 3/513; G01J 3/0259; G01J 3/262; G01J 2003/1226; H01L 27/14625; H01L 27/1463
USPC .................... 356/154, 416; 359/359, 885–892
See application file for complete search history.

(56) References Cited

U.S. PATENT DOCUMENTS

| | | | |
|---|---|---|---|
| 6,521,882 B1 * | 2/2003 | Sumiya et al. | 250/208.2 |
| 6,590,660 B2 * | 7/2003 | Jung et al. | 356/419 |
| 2005/0035304 A1 * | 2/2005 | Colvin et al. | 250/458.1 |
| 2005/0173773 A1 * | 8/2005 | Kim | 257/431 |
| 2006/0186547 A1 | 8/2006 | Wang et al. | |
| 2006/0285005 A1 | 12/2006 | Inaba et al. | |
| 2007/0139765 A1 * | 6/2007 | Daniel et al. | 359/443 |
| 2007/0290284 A1 * | 12/2007 | Shaffer | 257/432 |
| 2011/0183460 A1 | 7/2011 | Wang et al. | |
| 2011/0216315 A1 * | 9/2011 | Uematsu et al. | 356/326 |
| 2011/0242526 A1 * | 10/2011 | Van Bommel et al. | 356/121 |

FOREIGN PATENT DOCUMENTS

| | | |
|---|---|---|
| JP | A-61-205827 | 9/1986 |
| JP | A-06-129908 | 5/1994 |

(Continued)

*Primary Examiner* — Tarifur Chowdhury
*Assistant Examiner* — Michael P Lapage
(74) *Attorney, Agent, or Firm* — Oliff PLC

(57) ABSTRACT

An optical sensor includes a light receiving element (for example a photodiode) and an angle limiting filter that limits the incidence angle of incidence light with respect to the light receiving area of the light receiving element. When a wavelength of the incidence light is denoted by $\lambda$, a height of the angle limiting filter is denoted by R, and a width of an opening of the angle limiting filter is denoted by d, "$d^2/\lambda R \geq 2$" is satisfied.

20 Claims, 15 Drawing Sheets

| WAVELENGTH $\lambda$ | 500nm | 900nm |
|---|---|---|
| d=$\sqrt{2\lambda R}$ (d²/$\lambda$R=2) | 2.25μm | 3.0μm |
| BOUNDARY POINT | 2.3μm | 3.0μm |

(56) References Cited

FOREIGN PATENT DOCUMENTS

| | | |
|---|---|---|
| JP | A-08-094831 | 4/1996 |
| JP | A-2006-237576 | 9/2006 |
| JP | A-2006-351800 | 12/2006 |
| JP | A-2007-080918 | 3/2007 |
| WO | WO2010041198 * 4/2010 .............. G01S 3/782 |

* cited by examiner

FIG. 2A
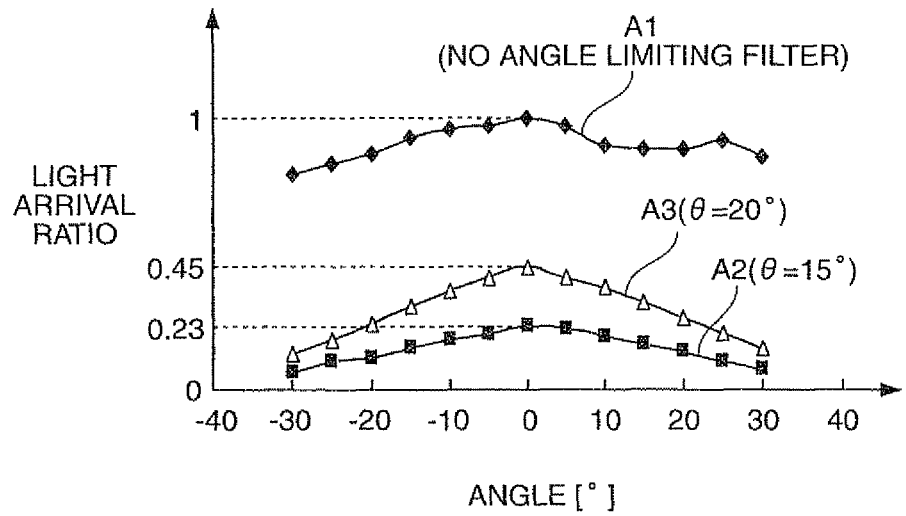
FIG. 2B
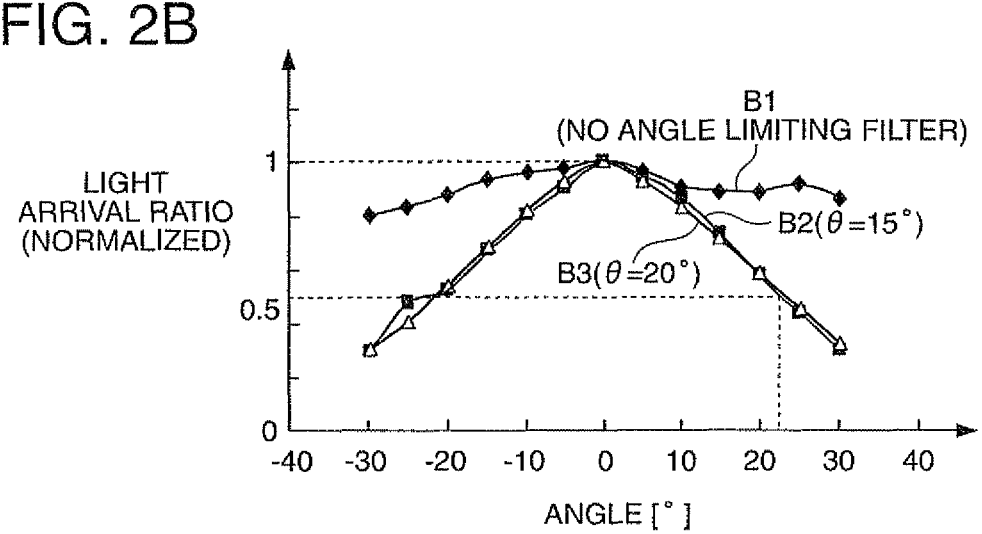
FIG. 2C
| $d^2/\lambda R$ | 0.72 | 1.32 |
|---|---|---|
| $\theta$ (d) | 15° | 20° |
| HALF-VALUE ANGLE | 22.5°~23° | 21°~22.5° |
| LIGHT ARRIVAL RATIO | 22.9% | 44.8% |

FIG. 3A
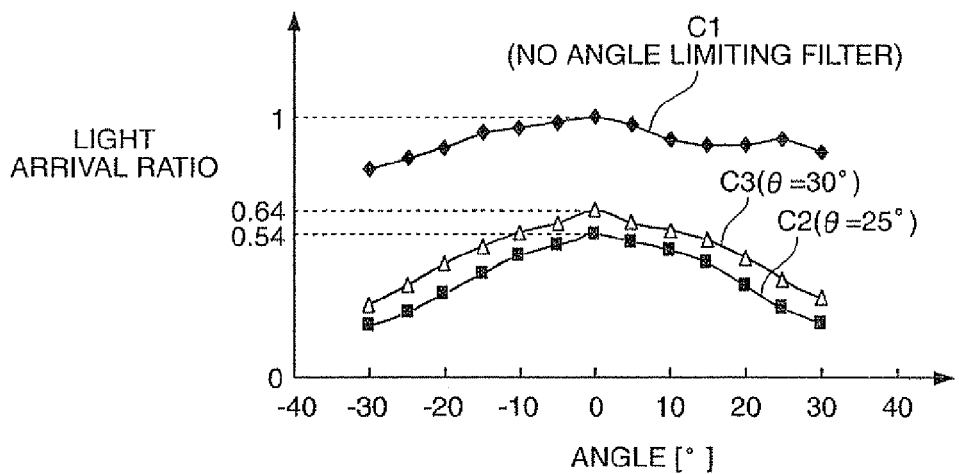
FIG. 3B
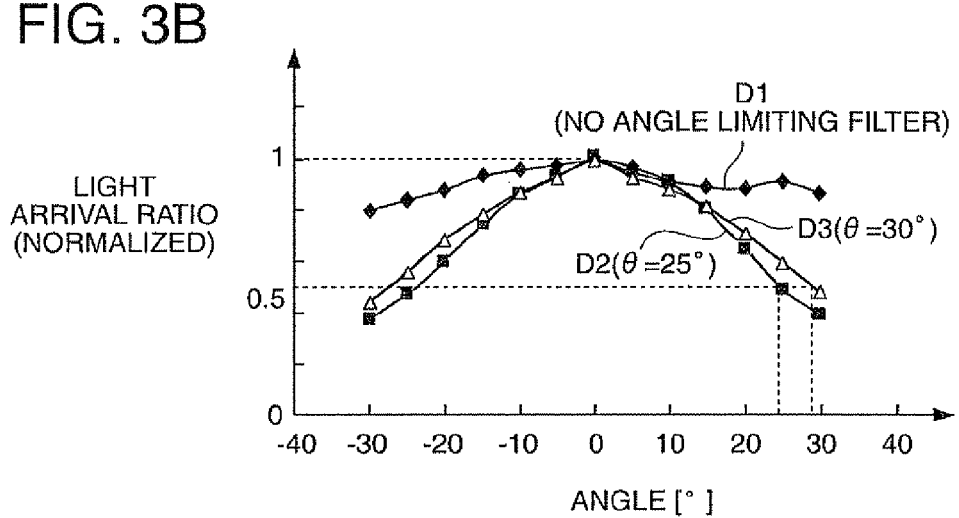
FIG. 3C
| $d^2/\lambda R$ | 2.17 | 3.34 |
|---|---|---|
| $\theta$ (d) | 25° | 30° |
| HALF-VALUE ANGLE | 24°~25° | 28°~29° |
| LIGHT ARRIVAL RATIO | 54.4% | 64.1% |

| WAVELENGTH $\lambda$ | 500nm | 900nm |
|---|---|---|
| $d=\sqrt{2\lambda R}$ ($d^2/\lambda R=2$) | 2.25$\mu$m | 3.0$\mu$m |
| BOUNDARY POINT | 2.3$\mu$m | 3.0$\mu$m |

OPTICAL SENSOR AND ELECTRONIC APPARATUS UTILIZING AN ANGLE LIMITING FILTER

The entire disclosure of Japanese Patent Application No. 2011-058181, filed Mar. 16, 2011 is expressly incorporated by reference herein.

BACKGROUND

1. Technical Field

The present invention relates to an optical sensor, an electronic apparatus, and the like.

2. Related Art

Recently, measurement using an optical sensor has been applied to various fields. For example, in order to diagnose or test target objects, spectroscopic sensors are used. As such spectroscopic sensors, there are pulse oximeters that measure the oxygen saturation in blood by using the light absorption of hemoglobin and saccharimeters that measure the sugar content of a fruit by using light absorption of sugar. In addition, illuminance sensors that are used for measuring illuminance and the like are used.

Among such optical sensors, there are optical sensors that limit the incidence angle of incidence light by using an angle limiting filter (for example, JP-A-6-129908). However, there is a problem in that controllability of the incidence angle is degraded depending on the condition of the width or the height of the opening of the angle limiting filter. For example, in a spectroscopic sensor, in a case where the angle controllability is degraded, desired wavelength resolution cannot be acquired.

In addition, in JP-A-2006-351800, a technique for sensing light of a plurality of wavelength bands by using multi-layer film filters having different thicknesses for each sensor is disclosed.

SUMMARY

An advantage of some aspects of the invention is that it provides an optical sensor, an electronic apparatus, and the like capable of controlling an incidence limitation angle of incidence light with high precision.

An aspect of the invention is directed to an optical sensor including: a light receiving element; and an angle limiting filter that limits an incidence angle of incidence light with respect to a light receiving area of the light receiving element. When a wavelength of the incidence light is denoted by $\lambda$, a height of the angle limiting filter is denoted by R, and a width of an opening of the angle limiting filter is denoted by d, "$d^2/\lambda R \geq 2$" is satisfied.

According to the above-described optical sensor, the angle limiting filter is formed to have a size satisfying the condition of "$d^2/\lambda R \geq 2$", and the incidence angle of incidence light with respect to the light receiving area is limited by the angle limiting filter. Accordingly, the incidence limitation angle of the incidence light can be controlled with high precision.

In the above-described optical sensor, the angle limiting filter may satisfy "$\tan^{-1}(d/R)<60°$".

Even in a case where there is no angle limiting filter, a limitation angle of 60° is acquired. Accordingly, by configuring the limitation angle to satisfy "$\tan^{-1}(d/R)<60°$", the angle limitation of the angle limiting filter can be effective.

In addition, in the above-described optical sensor, the light receiving element may be formed by an impurity region, which is formed on a semiconductor substrate, for a photodiode.

Furthermore, in the above-described optical sensor, the angle limiting filter may be formed from a light shielding material that is formed on the impurity region for the photodiode through a semiconductor process.

In such a case, since the constituent elements of the optical sensor can be formed through the semiconductor process, the size of the optical sensor can be decreased.

In addition, in the above-described optical sensor, the angle limiting filter may be formed by a conductive plug of a contact hole vacated in an insulating film that is stacked on the semiconductor substrate.

In such a case, the angle limiting filter can be formed by the conductive plug. For example, in a case where the conductive plug is a tungsten plug, tungsten has a property of absorbing light, and accordingly, the light shielding property can be improved.

In addition, in the above-described optical sensor, it may be configured such that a processing circuit that processes an output signal of the light receiving element is included, and the angle limiting filter is formed through a wiring forming process in which a wiring of the processing circuit is formed.

In such a case, since the angle limiting filter can be formed through the wiring forming process, the angle limiting filter can be formed by using a general semiconductor process. In addition, since the photodiode and the processing circuit can be integrated, the size of the optical sensor can be decreased.

In addition, in the above-described optical sensor, an optical band-pass filter that transmits light of a specific wavelength out of the incidence light may be included.

In such a case, light of a specific wavelength out of the incidence light can be allowed to be incident to the angle limiting filter and light receiving area of the photodiode.

In addition, in the above-described optical sensor, the optical band-pass filter may be formed by a multi-layer thin film that is tilted with respect to a light receiving face of the light receiving element at an angle corresponding to a transmission wavelength.

In addition, in the above-described optical sensor, it may be configured such that the optical band-pass filter is formed by a plurality of sets of multi-layer thin films having mutually different transmission wavelengths, and the plurality of sets of multi-layer thin films has tilt angles with respect to the light receiving face in accordance with the transmission wavelengths and is formed through a simultaneous thin-film forming process.

In such a case, the optical band-pass filter is formed by a multiple-layer thin film, and the transmission wavelength can be set in accordance with the tilt angle of the multi-layer thin film. In addition, a plurality of multi-layer thin films having mutually different transmissive wavelengths can be simultaneously formed.

In addition, in the above-described optical sensor, in a case where an arrival ratio characteristic of the incident light that passes through the angle limiting filter and arrives at the light receiving area has a first characteristic region in which a slope of the arrival ratio characteristic with respect to the width of the opening is a first slope and a second characteristic region in which a slope of the arrival ratio characteristic with respect to the width of the opening is a second slope that is lower than the first slope, the opening may be formed such that the width of the opening is equal to or larger than the width of the opening at a change point at which the arrival ratio characteristic changes from the first slope to the second slope.

In such a case, the width or the height of the opening of the angle limiting filter can be set based on the light arrival ratio characteristic according to the width of the opening, and accordingly, the angle controllability and the light arrival ratio can be improved.

In addition, in the above-described optical sensor, the optical sensor may be a spectroscopic sensor that is used for spectrally dispersing the incidence light.

Furthermore, in the above-described optical sensor, the optical sensor may be an illuminance sensor that is used for measuring illuminance of the incidence light.

In addition, in the above-described optical sensor, the optical sensor may be an elevation angle sensor that is used for measuring an elevation angle of a light source.

Another aspect of the invention is directed to an optical sensor including: an angle limiting filter that limits an incidence angle of incidence light with respect to a light receiving area of a light receiving element. When a wavelength of the incidence light is denoted by λ, a height of the angle limiting filter is denoted by R, and a width of an opening of the angle limiting filter is denoted by d, "$d^2/\lambda R \geq 2$" is satisfied.

Still another aspect of the invention is directed to an optical sensor including: a light receiving element; and an angle limiting filter that limits an incidence angle of incidence light with respect to a light receiving area of the light receiving element. In a case where an arrival ratio characteristic of the incident light that passes through the angle limiting filter and arrives at the light receiving area has a first characteristic region in which a slope of the arrival ratio characteristic with respect to the width of the opening is a first slope and a second characteristic region in which a slope of the arrival ratio characteristic with respect to the width of the opening is a second slope that is lower than the first slope, the opening is formed such that the width of the opening is equal to or larger than the width of the opening at a change point at which the arrival ratio characteristic changes from the first slope to the second slope.

Yet another aspect of the invention is directed to an electronic apparatus including any of the above-described optical sensor.

BRIEF DESCRIPTION OF THE DRAWINGS

The invention will be described with reference to the accompanying drawings, wherein like numbers reference like elements.

FIGS. 2A to 2C show an example of angle characteristics of the light arrival ratio in the comparative example.

FIGS. 3A to 3C show an example of angle characteristics of the light arrival ratio in this embodiment.

DESCRIPTION OF EXEMPLARY EMBODIMENTS

Hereinafter, preferred embodiments of the invention will be described in detail. However, the embodiments described below are not for the purpose of limiting the scope of the invention described in the appended claims, and it cannot be determined that all the configurations described in the embodiments are essential as solving means according to the embodiments of the invention. In addition, although an example will be described below in which the optical sensor is a spectroscopic sensor, the optical sensor according to the embodiments is not limited to a spectroscopic sensor as will be described later.

1. Configuration

Figure 1A:
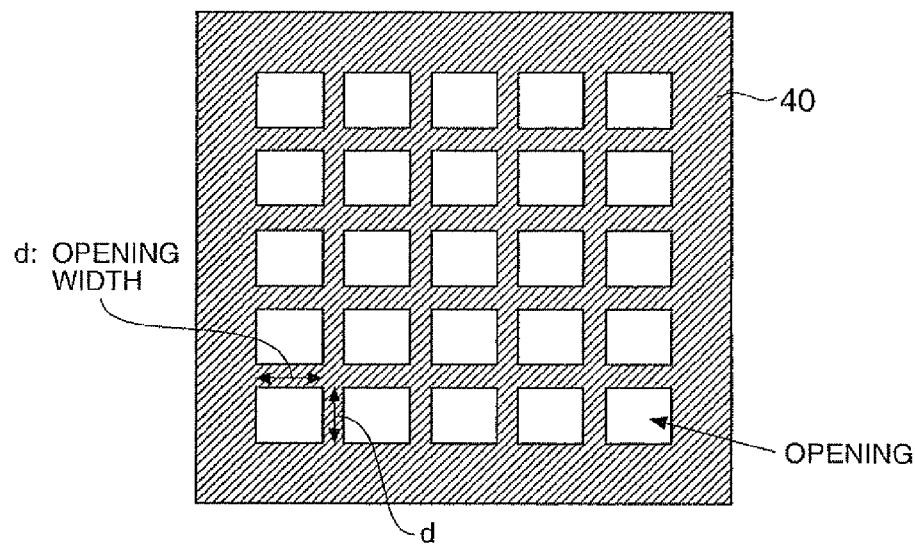
FIGS. 1A and 1B show a configuration example of an optical sensor according to an embodiment of the invention.
Figure 1B:
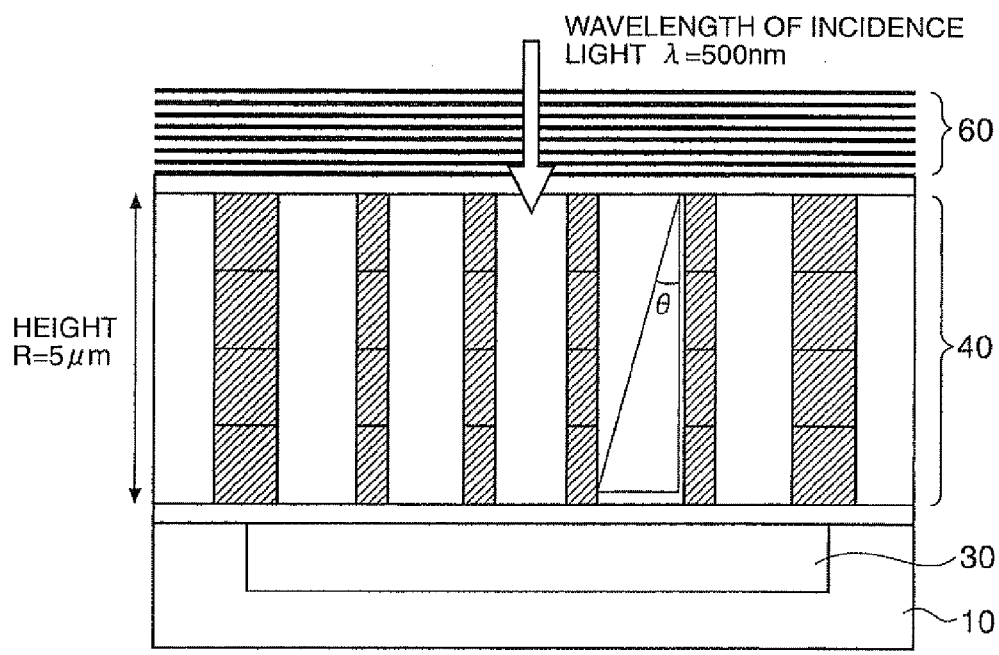

FIGS. 1A and 1B show a configuration example of a spectroscopic sensor (in a broad sense, an optical sensor) according to this embodiment. Hereinafter, for simplicity, the configuration of this embodiment will be schematically shown, and the dimensions and the ratios illustrated in the figures are not real values.

FIG. 1A shows a plan view of an angle limiting filter 40 as a plan view viewed in a direction perpendicular to the plane of a semiconductor substrate 10. FIG. 1B shows a cross-sectional view of a spectroscopic sensor that includes the angle limiting filter 40. The spectroscopic sensor includes the semiconductor substrate 10, a photodiode 30 (a photosensor or an impurity region of a photodiode in a broad sense), an angle limiting filter 40, and an optical band-pass filter 60 (a multi-layer film filter or a dielectric filter).

The photodiode 30 and the angle limiting filter 40, as will be described later, are formed on the semiconductor substrate 10 through a semiconductor process. Here, "on the semiconductor substrate 10" represents a side on which the angle limiting filter 40 and the like are formed in a direction perpendicular to the plane of the semiconductor substrate 10.

The angle limiting filter 40, for example, is formed in a lattice pattern in a plan view and limits the incidence angle of the incidence light incident to the photodiode 30. In particular, the angle limiting filter 40 is formed from a material (for example, a tungsten plug) that has a light shielding property for a wavelength detected by the photodiode 30 and shields light such that light having an incidence angle larger than a limiting angle θ [°] is not incident to the photodiode 30.

The angle limiting filter 40 is formed so as to satisfy the following Equation (1). The conditional equation represented in the following Equation (1) will be described later. Here, d [μm] is an opening width of the angle limiting filter 40, R [μm] is the height of the angle limiting filter 40, and λ [μm] is the wavelength of incidence light.

$$d^2/(\lambda \times R) \geq 2 \text{ and } 60° > \theta = \tan^{-1}(d/R) \tag{1}$$

The optical band-pass filter 60 is formed by a multi-layer thin film stacked on the angle limiting filter 40. As will be described later, by limiting the incidence angle by using the angle limiting filter 40, the transmissive wavelength band of the optical band-pass filter 60 is limited, whereby spectroscopic characteristics of desired wavelength resolution can be acquired.

According to this embodiment described above, by forming the angle limiting filter through a semiconductor process, the size of the optical sensor can be decreased. However, the size of the opening, of the angle limiting filter is decreased due to the decrease in size of the optical sensor, and there is a problem in that the controllability of the incidence angle may be degraded depending on the condition of the width d or the height R of the opening. Regarding this point, an angle limiting filter satisfying the condition of "$d^2/(\lambda \times R) < 2$" will be described as a comparative example.

FIGS. 2A to 2C show measured values of the angle characteristics of the comparative example. In FIGS. 2A to 2C, measured values at a wavelength $\lambda=0.5$ μm and a height R=5 μm are shown. Hereinafter, the limitation angle θ is an incidence angle when the light arrival ratio is 1/2 of the light arrival ratio of the case where the incidence angle is 0°. However, this embodiment is not limited thereto, and the limitation angle θ may be defined as an incidence angle of a case where the light arrival ratio is another ratio.

FIG. 2A shows the characteristic of the light arrival ratio when the light arrival ratio at an incidence angle of 0° is 1 in a case where there is no angle limiting filter. The light arrival ratio is a ratio of the amount of light arriving at the photodiode to the amount of light incident to the opening of the angle limiting filter.

As represented by A1 in FIG. 2A, in a case where there is no angle limiting filter, the light arrival ratio gently decreases in accordance with an increase in the incidence angle. As represented by A2, in a case where the limitation angle θ=15°, and the opening width d=1.34 μm, the maximum value of the light arrival ratio is 0.23. In addition, as represented by A3, in a case where the limitation angle θ=20°, and the opening width d=1.82 μm, the maximum value of the light arrival ratio is 0.45. As above, the angle limiting filter of the comparative example cuts the angle at which the light arrival ratio is 50%, and accordingly, in a case where incidence light is dark, there is a possibility of the sensitivity being insufficient.

FIG. 2B shows a light arrival ratio characteristic acquired by normalizing the light arrival ratio characteristic shown in FIG. 2A to the incidence angle 0° as "1". In FIG. 2B, measured values in a case where there is no angle limiting filter are represented as B1, measured values in a case where θ=15° are represented as B2, and measured values in a case where θ=20° are represented as B3. As illustrated in B2 and B3, all the limitation angles that are actually measured are about 22°, and the desired angle controllability is not acquired.

In FIG. 2C, the above-described measured values are arranged. As shown in FIG. 2C, $d^2/(\lambda \times R) < 2$ in any case of θ=15° and θ=20°, and it can be understood that the angle controllability and the light arrival ratio cannot be sufficiently acquired in this range.

From this point, according to this embodiment, as represented in Equation (1) described above, by forming the angle limiting filter such that $d^2/(\lambda \times R) \geq 2$ is satisfied, the angle controllability and the light arrival ratio can be improved. A detailed description will be made below with reference to FIGS. 3A to 3C. In FIGS. 3A to 3C, measured values at a wavelength $\lambda=0.5$ μm and a height R=5 μm are represented.

In FIG. 3A, the light arrival ratio characteristic when the light arrival ratio at an incidence angle of 0° is "1" in a case where there is no angle limiting filter is represented. As represented by C1 shown in FIG. 3A, the characteristic of the case where there is no angle limiting filter is not different from that of the comparative example. As represented by C2,
in a case where the limitation angle θ=25° and the opening width d=2.33 μm, a maximum value of the light arrival ratio is 0.54. In addition, as represented by C3, in a case where the limitation angle θ=30° and the opening width d=2.89 μm, a maximum value of the light arrival ratio is 0.64. As above, according to this embodiment, the light arrival ratio is higher than 50%.

In FIG. 3B, a light arrival ratio characteristic acquired by normalizing the light arrival ratio characteristic, which is shown in FIG. 3A, to an incidence angle of 0° as "1" is illustrated. As represented by D1 shown in FIG. 3B, measured values of the case where there is no angle limiting filter are illustrated, as represented by D2, measured values in a case where θ=25° are illustrated, and as represented by D3, measured values in a case where θ=30° are illustrated. As represented by D2 and D3, the limitation angles that are actually measured are 24° to 25° and 28° to 29°, and accordingly, desired angle controllability can be acquired.

In FIG. 3C, the above-described measured values are arranged. As shown in FIG. 3C, the condition of $d^2/(\lambda \times R) \geq 2$ is satisfied in any case of θ=25° and θ=30°, and it can be understood that the angle controllability and the light arrival ratio are sufficiently acquired in this range. In this manner, by improving the angle controllability, for example, in a spectroscopic sensor, desired wavelength resolution can be realized. In addition, since the light arrival ratio is higher than that of the comparative example, high-sensitivity sensing can be performed even in a case where the amount of light is small.

For example, when the angle limiting filter with θ=15° of the above-described comparative example is designed in the range of $d^2/(\lambda \times R) \geq 2$, as represented in the following Equation (2), it may be configured such that d=4.02 μm and R=15 μm. In addition, in the angle limiting filter with θ=20°, as represented in the following Equation (3), it may be configured such that d=3.64 μm and R=10 μm.

$$d^2/(\lambda \times R) = 4.02^2/(0.5 \times 15) = 2.15 \geq 2 \qquad (2)$$

$$d^2/(\lambda \times R) = 3.64^2/(0.5 \times 10) = 2.65 \geq 2 \qquad (3)$$

2. Opening Width Characteristics of Light Arrival Ratio

Figures 4A, 4B:
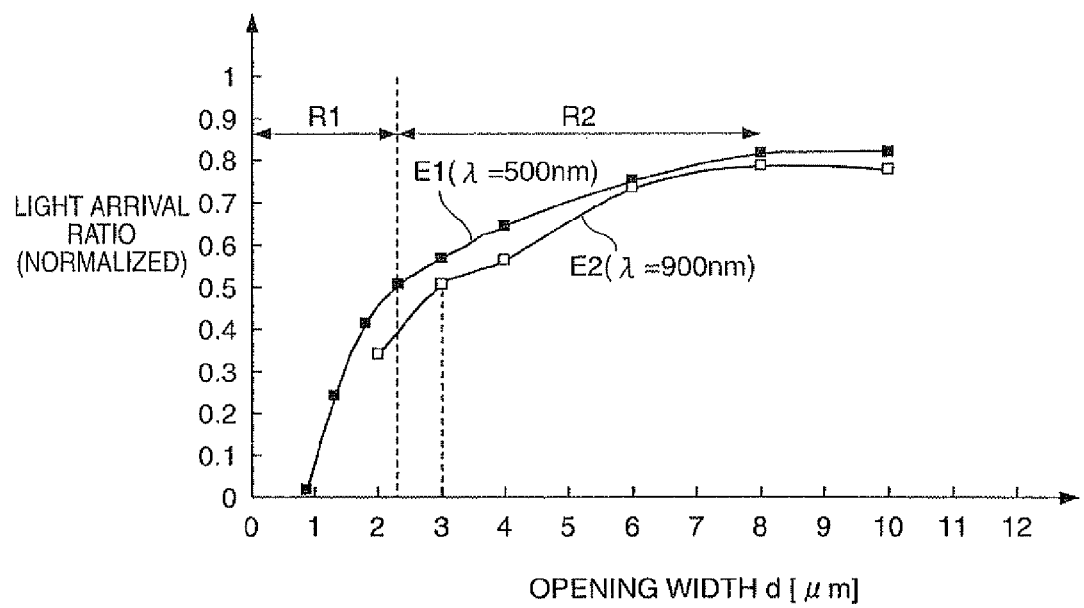
FIGS. 4A and 4B show an example of opening width characteristics of the light arrival ratio in this embodiment.

FIG. 4A shows light arrival ratio characteristics with respect to the opening width d. In FIG. 4A, E1 represents a measured value at a wavelength $\lambda=0.5$ μm and a height R=5 μm. In addition, E2 represents a measured value at a wavelength $\lambda=0.9$ μm and a height R=5 μm.

In the characteristics represented as E1, the slope of the tangent line near d=2.3 μm rapidly changes. Hereinafter, this point will be referred to as a boundary point. When the range of d≤2.3 μm up to the boundary point is set as a first characteristic region R1, the light arrival ratio increases with a constant (approximately constant) first slope in the first characteristic region R1. In addition, when the range of 2.3 μm≤d≤8 μm after the boundary point is set as a second characteristic region R2, the light arrival ratio changes with a constant (approximately constant) second slope, which is lower than the first slope, in the second characteristic region R2.

In the characteristics represented as E2, the boundary point is at d=3 μm, the first characteristics area is d≤3 μm, and the second characteristic region is 3 μm≤d≤8 μm.

As shown in FIG. 4B, the above-described boundary point matches (approximately matches) the value of d in a case where $d^2/(\lambda \times R) = 2$. In other words, by forming the angle limiting filter such that the opening width d is larger than that at the boundary point, the condition of $d^2/(\lambda \times R) \geq 2$ is satisfied, and it can be understood that the angle controllability and the light arrival ratio can be improved. As above, according to this embodiment, the size of the angle limiting filter can be determined based on the light arrival ratio characteristic with respect to the opening width d as well.

In addition, in this embodiment, it is preferable to configure the angle limiting filter so as to be close to $d^2/(\lambda \times R)2$ as the boundary point. At the boundary point, the size of the optical sensor can be decreased by minimizing the height R of the angle limiting filter. In other words, the limitation angle $\theta=\tan^{-1}(d/R)$, and accordingly, when the limitation angle $\theta$ is determined, the aspect ratio d/R is fixed. Accordingly, at a boundary point at which the opening width d is minimal in the range satisfying the condition of $d^2/(\lambda \times R) \geq 2$, R can be minimized as well.

In the above-described embodiment, as shown in FIG. 1B, the optical sensor includes a light receiving element and an angle limiting filter 40. The angle limiting filter 40 limits the incidence angle of incidence light with respect to the light receiving area of the light receiving element. As represented by Equation (1) described above, when the wavelength of the incidence light is denoted by $\lambda$, the height of the angle limiting filter is denoted by R, and the width of the opening of the angle limiting filter is denoted by d, "$d^2/\lambda R \geq 2$" is satisfied.

Accordingly, it is possible to control the incidence liming angle $\theta$ of incidence light with high precision. In addition, the light arrival ratio can be improved. In other words, compared to the measured value under the condition of $d^2/\lambda R<2$ shown in FIG. 2C, a desired limitation angle is realized at the measured value measured under the condition of $d^2/\lambda R \geq 2$ shown in FIG. 3C, and accordingly, the light arrival ratio is increased. The reason for this is understood to be the propagation characteristics of light inside the angle limiting filter 40 as described with reference to FIG. 5.

Here, although the light receiving element corresponds to the photodiode 30 (an impurity region for a photodiode) shown in FIG. 1B, this embodiment is not limited thereto. For example, the light receiving element may be a photoelectric conversion device.

Here, the limitation angle $\theta$ is an angle $\theta$ at which a ratio of the amount of light arriving at the light receiving face in a case where incidence light is incident to the angle limiting filter 40 at an incidence angle of $\theta$ to the amount of light arriving at the light receiving face in a case where incidence light is incident to the angle limiting filter 40 at an incidence angle of 0° is a predetermined attenuation ratio. For example, the predetermined attenuation ratio is 1/2.

Here, the height R of the angle limiting filter 40 is a height in a direction perpendicular to the plane of the semiconductor substrate 10 and, for example, a height from the lower end to the upper end of a light shielding material that forms the angle limiting filter 40.

In addition, the opening of the angle limiting filter 40 is an area located on the side to which incidence light is incident in which a light shielding material is not present and is an area in which the incidence light is incident to the angle limiting filter 40. Furthermore, the outer circumference of the opening does not necessarily need to be closed by the light shielding material, and the light shielding material may be intermittently arranged along the outer circumference of the opening.

In addition, the opening width d of the opening is a length that defines the limitation angle $\theta$ (an aspect ratio of the opening width d to the height R) and, for example, in the case of a square-shaped opening, is the length of one side of the square. Furthermore, in the case of a rectangle-shaped opening, the opening width is the length of a longer side of the rectangle, in the case of a circle-shaped opening, the opening width is the diameter of the circle, and, in the case of an oval-shaped opening, the opening width is the length of the major axis of the oval.

In this embodiment, as represented in Equation (1) presented above, the angle limiting filter 40 satisfies the condition of "$\tan^{-1}(d/R)<60°$".

Figure 8:
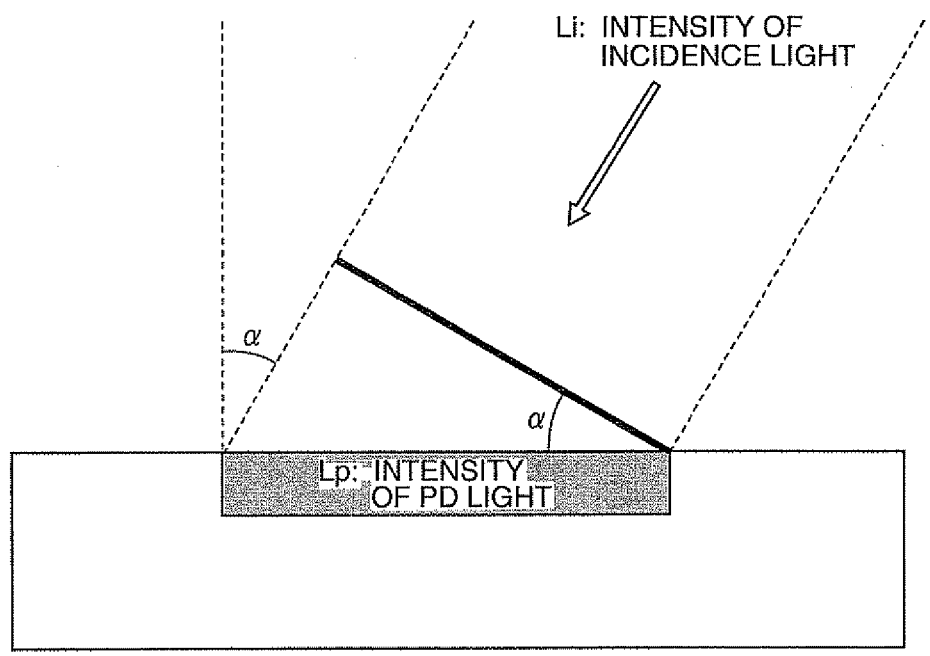
FIG. 8 is a schematic diagram illustrating the upper limit of a limitation angle.

As will be described later with reference to FIG. 8, the light arrival ratio is 1/2 at an incidence angle of 60° even in a case where there is no angle limiting filter 40. Accordingly, by setting the limitation angle $\theta=\tan^{-1}(d/R)<60$, the angle limiting performed by the angle limiting filter 40 is effective.

In addition, in this embodiment, as shown in FIG. 4A, the arrival ratio characteristic of incidence light that passes through the angle limiting filter 40 and arrives at the light receiving area includes a first characteristic region R1 and a second characteristic region R2. In the first characteristic region R1, the slope of the arrival ratio characteristic with respect to the width d of the opening is a first slope. In the second characteristic region R2, the slope of the arrival ratio characteristic with respect to the width d of the opening is a second slope that is lower than the first slope. In such a case, the width d of the opening is formed to be equal to or larger than the width of the opening at a change point (boundary point) at which the arrival ratio characteristic is changed from the first slope to the second slope.

Accordingly, based on the light arrival ratio characteristic with respect to the opening width d, the opening width d or the height R of the angle limiting filter that has high angle controllability and a high light arrival ratio can be determined. In addition, as described above, by configuring the angle limiting filter so as to be close to the change point, the size of the optical sensor can be decreased by minimizing the height R.

As above, although a case where the optical sensor according to this embodiment is a spectroscopic sensor has been described, this embodiment is not limited thereto. For example, it may be configured such that the optical band-pass filter 60 is omitted, and the optical sensor according to this embodiment is applied to an illuminance sensor or an elevation angle sensor.

Here, the illuminance sensor is an optical sensor that measures the intensity of illuminance (lux or lumen/square meter) of natural light or illuminance light. In this embodiment, since the incidence angle is limited by the angle limiting filter, the incidence of unwanted light from objects other than the measurement target can be limited. For example, it may be considered to apply this embodiment to a system that automatically turns vehicle headlights on or off in accordance with the brightness level in the traveling direction. For example, when the vehicle enters a tunnel, the system does not respond to unwanted light, and accordingly, appropriate automatic turning on/off of the headlights can be performed.

In addition, the elevation sensor is an optical sensor that measures the elevation angle that is an angle formed by the direction of the sun or an illuminance light source and a reference plane. The reference plane, for example, is a horizontal plane. In this embodiment, since the incidence angle is limited by the angle limiting filter, the elevation angle can be measured. For example, application of this embodiment to a photovoltaic power generation system may be considered. In such a case, the direction of the sun is measured with high precision, and, by facing a solar cell panel in the direction of the sun, electricity can be generated with high efficiency.

3. Relation Between Light Intensity Distribution and Angle Controllability

Figure 5:
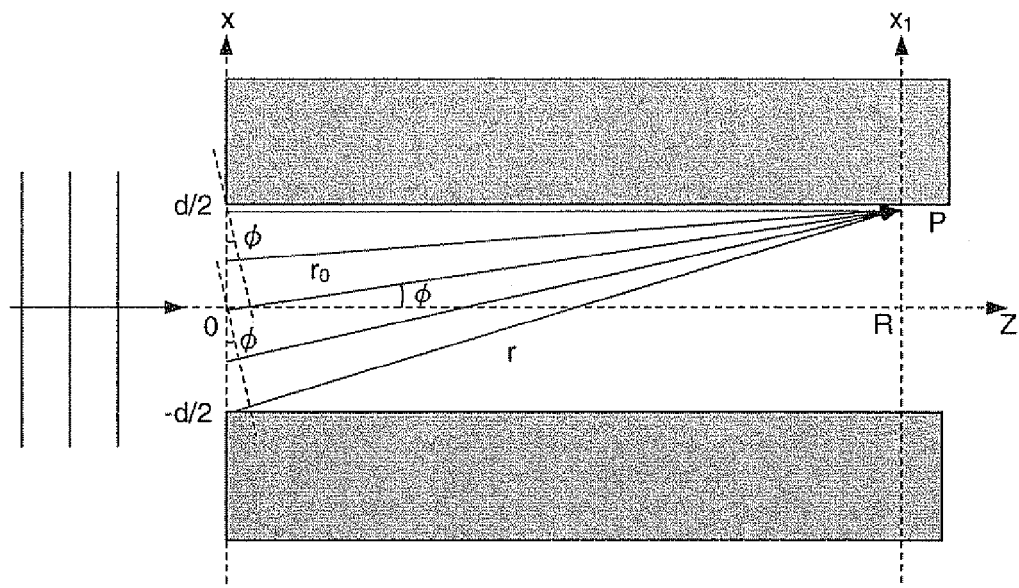
FIG. 5 is a schematic diagram illustrating a conditional equation of $d^2/(\lambda \times R) \geq 2$ based on the principle.

Next, the conditional equation of $d^2/(\lambda \times R) \geq 2$ will be described based on the principle with reference to FIG. 5. As shown in FIG. 5, the vertical direction facing the semiconductor substrate is set as the Z axis, a direction that is parallel to one side of the opening and is perpendicular to the Z axis is set as the x axis, and a direction that is parallel to the x axis within an arbitrary plane inside the angle limiting filter is set as the $x_1$ axis. Hereinafter, for simplification, a two-dimensional calculation is performed, and it is assumed that there is no effect from the side wall of the angle limiting filter. In addition, it is assumed that the incidence light is a plane wave of a frequency k that propagates in parallel with the Z axis.

The light intensity $I(x_1)$ on the $x_1$ axis is acquired. Here, light $Up(x_1)$ at a point P on the $x_1$ axis is combined light that passes through the opening and is represented by the following Equation (4). Here, represents an imaginary number, k ($k=2\pi/\lambda$) represents the frequency of the incidence light, and r represents a distance from a point located on the x axis to the point P.

$$Up(x_1) = \frac{i}{\lambda} \int_{-d/2}^{d/2} \frac{\exp(-ikr)}{r} dx \qquad (4)$$

In a case where the distance r is sufficiently larger than the opening width d, r represented in the denominator of Equation (4) can be extracted out of the integral as R, and the following Equation (5) is formed.

$$Up(x_1) = \frac{i}{\lambda R} \int_{-d/2}^{d/2} \exp(-ikr) dx \qquad (5)$$

In addition, in a case where the angle $\phi$ represented in FIG. 5 is sufficiently small, and it is assumed that $\cos\phi \approx 1$, the following Equation (6) is formed. When the following Equation (6) is substituted into Equation (5), the following Equation (7) is formed.

$$\tan\phi = \frac{x_1}{R} \approx \sin\phi, \quad r = r_0 + x\sin\phi = r_0 + x\frac{x_1}{R} \qquad (6)$$

$$Up(x_1) = \frac{i}{\lambda R} \int_{-d/2}^{d/2} \exp\left(-ik\left(r_0 + x\frac{x_1}{R}\right)\right) dx \qquad (7)$$

When Equation (7) is integrated, the following Equation (8) is formed. Since the light intensity $I(x_1)$ is the magnitude of the light $Up(x_1)$ squared, the following Equation (9) is formed by using $k=2\pi/\lambda$.

$$Up(x_1) = \frac{i}{\lambda R} \exp(-ikr_0) \left[ \frac{R}{-ikx_1} \exp\left(-ikx\frac{x_1}{R}\right) \right]_{-d/2}^{d/2} \qquad (8)$$
$$= \frac{i}{\lambda R} \exp(-ikr_0) \left[ \frac{R}{-ikx_1} \left\{ \exp\left(-ik\frac{d}{2}\frac{x_1}{R}\right) - \exp\left(ik\frac{d}{2}\frac{x_1}{R}\right) \right\} \right]$$
$$= \frac{id}{\lambda R} \exp(-ikr_0) \frac{2R}{kx_1 d} \sin\left(\frac{kx_1 d}{2R}\right)$$

$$I(x_1) = |Up(x_1)|^2 \qquad (9)$$
$$= \left(\frac{d}{\lambda R}\right)^2 \left\{ \frac{2R}{kx_1 d} \sin\left(\frac{kx_1 d}{2R}\right) \right\}^2$$
$$\propto \left(\frac{\lambda R}{\pi x_1 d}\right)^2 \left\{ \sin\left(\frac{\pi x_1 d}{\lambda R}\right) \right\}^2$$

FIGS. 6A to 6E show the examples of the characteristics of the light intensity $I(x_1)$ represented in Equation (9). FIGS. 6A to 6E represent calculated values at a wavelength $\lambda=0.5$ μm and a height R=5 μm and represent calculated values at opening widths d=1 μm, 1.5 μm, 2 μm, 2.5 μm, and 3 μm.

Figure 6A:
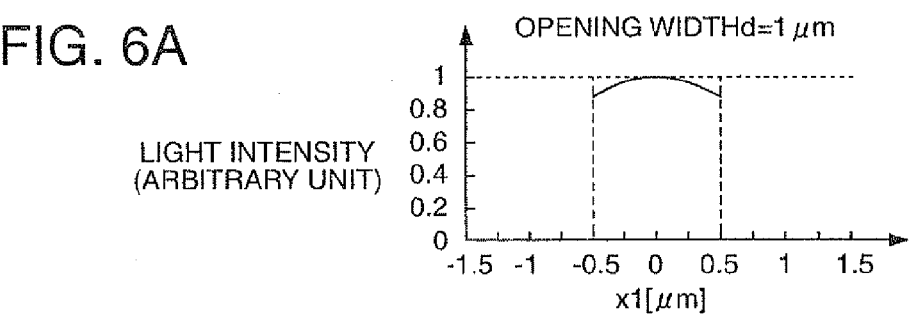
FIGS. 6A to 6E are schematic diagrams illustrating the conditional equation of $d^2/(\lambda \times R) \geq 2$ based on the principle.
Figure 6B:
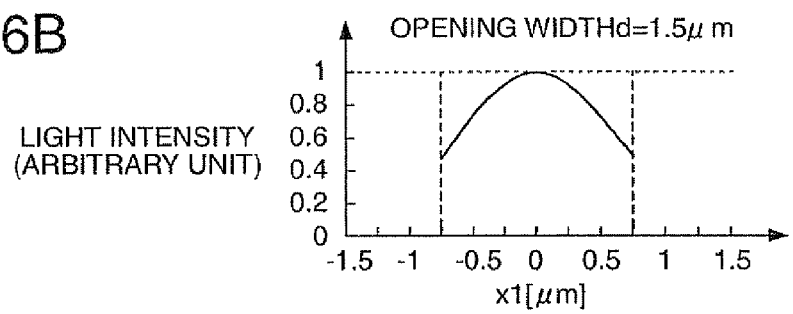
Figure 6C:
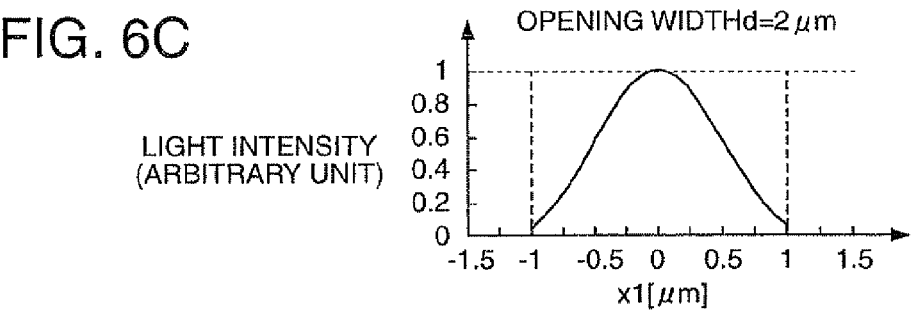
Figure 7:
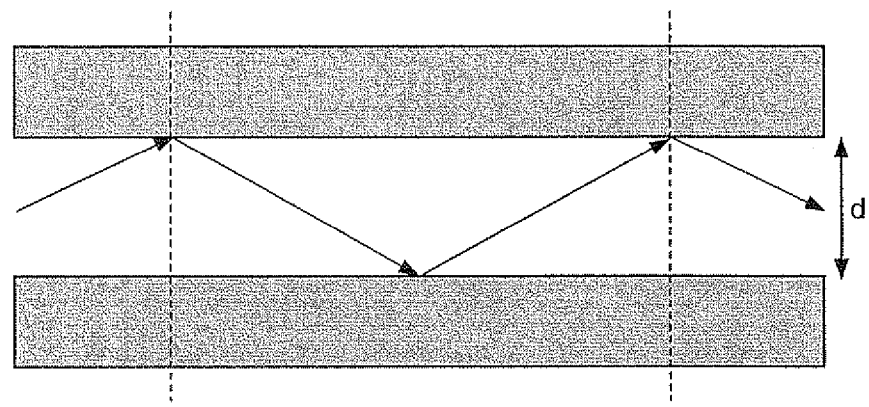
FIG. 7 is a schematic diagram illustrating the conditional equation of $d^2/(\lambda \times R) \geq 2$ based on the principle.

As shown in FIGS. 6A to 6C, in the range d<2.25 μm, the light intensity distribution inside the opening is flat as the opening width d decreases, and the light intensity is not zero on the side wall face of the angle limiting filter. Actually, there is a boundary condition that the light intensity is zero on the side wall face, and accordingly, it can be understood that such a light sensitivity distribution is not realized. In such a case, as shown in FIG. 7, light is predicted to be reflected diagonally on the side wall face and travel while satisfying the boundary condition. Even in a case where the incidence angle is 0°, light travels by being reflected on the side wall face, and thus, it is understood that light is absorbed by the side wall face and the light arrival ratio is low. In addition, even in a case where the incidence angle is 0° or in a case where there is an angle, light travels by being reflected on the side wall face in the same manner, and accordingly, it is understood that the angle dependency of the light arrival rate is decreased, and the angle controllability is degraded.

Figure 6D:
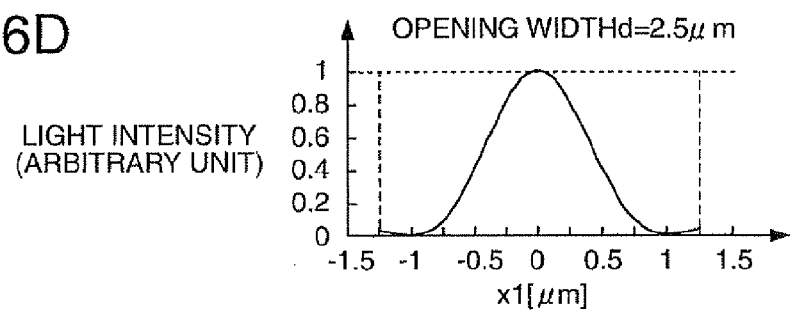
Figure 6E:
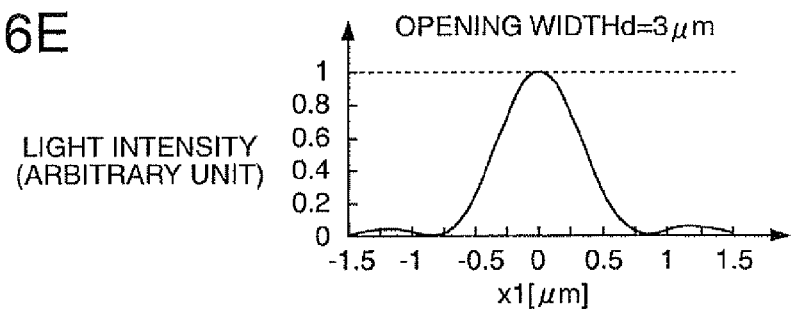

On the other hand, as shown in FIGS. 6D and 6E, in the range of d≥2.25 μm, light intensity is zero (approximately zero) on the side wall face, and the light travels to an area near the center portion without being brought into contact with the side wall face. Accordingly, even in a case where the incidence angle is 0°, light is not absorbed on the side wall face, and it is predicted that the light arrival ratio is high. In addition, as the incidence angle is increased, light is brought into contact with the side wall face and is absorbed, and accordingly, the dependency of the light arrival ratio on the angle is increased, whereby it is understood that the angle controllability is improved.

Here, d=2.25 is the value of d under the condition $I(x_1=d/2)=0$ under which the light intensity is zero on the side wall face based on Equation (9). In other words, when the form of the equation is changed by substituting $\pi x_1 d/\lambda R = \pi$ and $x_1=d/2$ therein, $d=\sqrt{(2\lambda R)}=\sqrt{(2\times0.5\times5)}\approx2.25$ μm.

4. Upper Limit of Limitation Angle

The upper limit θ<60° represented in Equation (1) described above will be described in detail with reference to FIG. 8. As shown in FIG. 8, it is assumed that there is no angle limiting filter, and incidence light having an intensity of Li is incident to a photodiode at an incidence angle α. In such a case, the light intensity Lp on the light receiving face of the photodiode is represented by the following Equation (10).

$$Lp = Li \times \cos\alpha \qquad (10)$$

Based on Equation (10), Lp/Li=1/2 at α=60°, and the limitation angle is 60°, which is the same. In other words, in a case where an incidence angle at which the light arrival ratio is 1/2 is defined as the limitation angle θ, the limitation angle θ=60° without using any angle limiting filter, and accordingly, in order to bring out the angle controllability of the angle limiting filter, it is necessary to set the limitation angle as θ<60°.

5. Spectroscopic Sensor

Hereinafter, a detailed configuration example of the spectroscopic sensor according to the above-described embodiment will be described.

Figure 9:
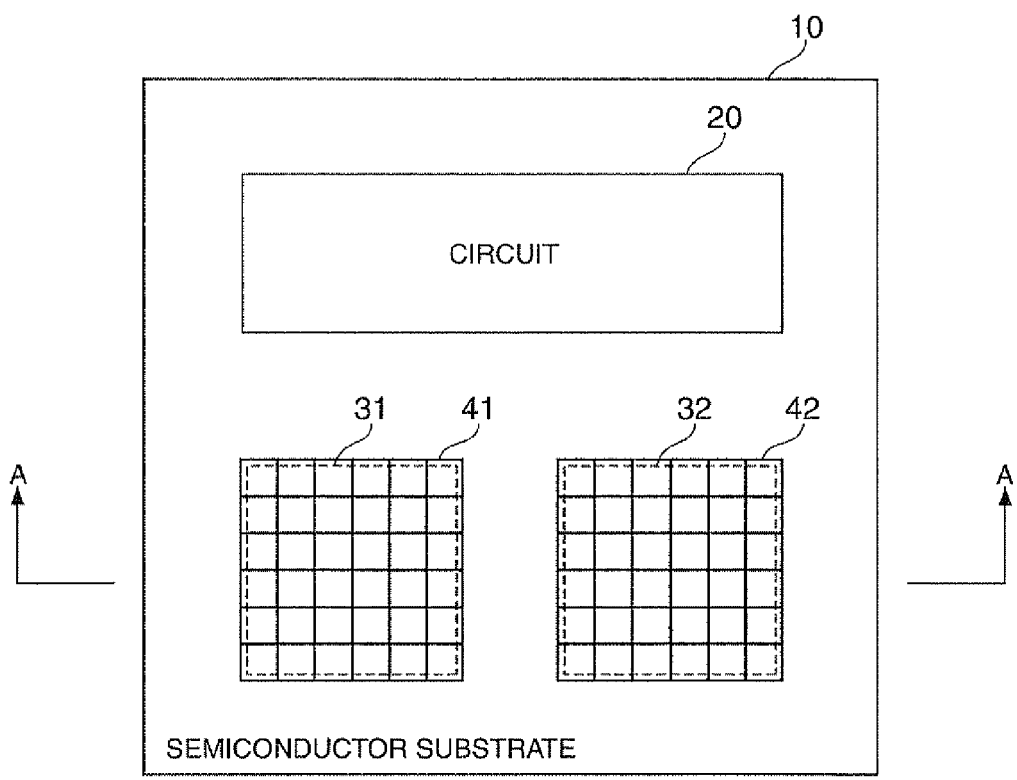
FIG. 9 is a plan view showing a configuration example of a spectroscopic sensor.

FIG. 9 shows a plan view of a semiconductor substrate 10 in which the spectroscopic sensor is formed. FIG. 9 is a plan view viewed from the front face side on which a circuit 20, an angle limiting filter 41, and the like are formed in a plan view of the semiconductor substrate 10 viewed in a direction perpendicular to the plane thereof. As will be described later, while a multi-layer film filter is formed on the angle limiting filters 41 and 42, for simplification, the illustration thereof is omitted in FIG. 9.

The spectroscopic sensor shown in FIG. 9 includes: a semiconductor substrate 10; a circuit 20; a first photodiode 31 (in a broad sense, a first photosensor or an impurity region for a first photodiode); a second photodiode 32 (in a broad sense, a second photosensor or an impurity region for a second photodiode); a first angle limiting filter 41; and a second angle limiting filter 42.

The semiconductor substrate 10, for example, is configured by a P-type or N-type silicon substrate (silicon wafer). On the semiconductor substrate 10, the circuit 20, the photodiodes 31 and 32, and the angle limiting filters 41 and 42 are formed through a semiconductor process.

The angle limiting filters 41 and 42, for example, are formed in a lattice pattern in plan view and limits the incidence angle of incidence light for the photodiodes 31 and 32. The circuit 20, for example, is configured by an amplifier that processes, for example, output signals of the photodiodes 31 and 32, an A/D conversion circuit, and the like.

In addition, the spectroscopic sensor according to this embodiment is not limited to have the configuration shown in FIG. 9, and various changes can be made such as omission of some (the circuit 20) of the constituent elements thereof or addition of another constituent element. For example, two photodiodes and two angle limiting filters may be arranged as described above, or one or a plurality thereof may be formed. In addition, the angle limiting filters 41 and 42 may have a lattice pattern in plan view as described above or may have another shape.

Figure 10:
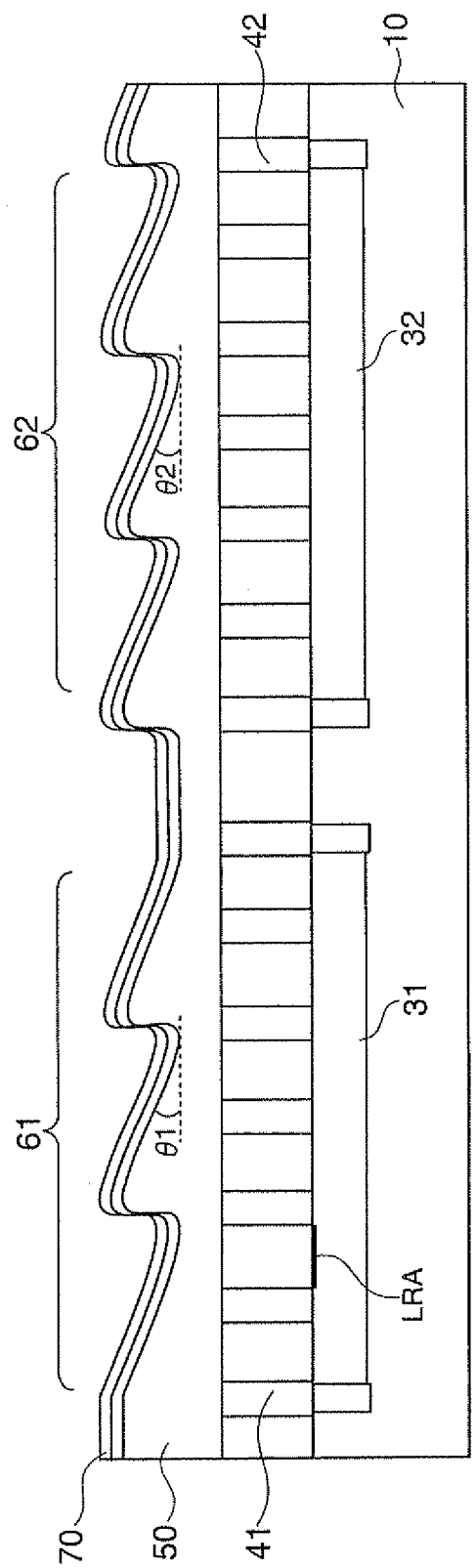
FIG. 10 is a cross-sectional view of the configuration example of the spectroscopic sensor.

FIG. 10 shows a cross-sectional view of the spectroscopic sensor. FIG. 10 is a cross-sectional view taken along line A-A shown in FIG. 9. The spectroscopic sensor shown in FIG. 10 includes: the semiconductor substrate 10; the photodiodes 31 and 32; the angle limiting filters 41 and 42; a tilted structure body 50 (angle structure body); a first optical band-pass filter 61 (a first multi-layer film filter or a first dielectric filter); and a second optical band-pass filter (a second multi-layer film filter or a second dielectric filter).

The photodiodes 31 and 32 are formed on the semiconductor substrate 10. As will be described later, these photodiodes 31 and 32 are formed by forming impurity regions through ion injection or the like. For example, the photodiodes 31 and 32 are implemented through a PN junction of an N-type impurity region formed on a P substrate and the P substrate. Alternatively, the photodiodes 31 and 32 are implemented through a PN junction of a P-type impurity region formed on a deep N well (N-type impurity region) and the deep N well.

The angle limiting filters 41 and 42 are formed by using a light shielding material (for example, a light absorbing material or a light reflecting material) that has a light shielding property for a wavelength detected by the photodiodes 31 and 32. In particular, the angle limiting filters 41 and 42 are formed through a wiring forming process included in the semiconductor process and are formed by conductive plugs such as tungsten plugs (in a broad sense, plugs made from a light absorbing material). In addition, the angle limiting filters 41 and 42 may be formed so as to include conductive layers such as aluminum wiring layers (in a broad sense, wiring layers formed from a light reflecting material).

The aspect ratio that is the ratio of the opening width to the height of the lower side of the angle limiting filters 41 and 42 is set in accordance with the transmission wavelength band (for example, BW1 and BW2 to be described later with reference to FIG. 11B) of the optical band-pass filters 61 and 62. The opening portions (hollow portions) of the angle limiting filters 41 and 42 are formed by using a material that is transparent for the wavelength detected by the photodiodes 31 and 32 and are formed (filled) by insulating layers such as $SiO_2$ films (silicon oxide films).

The tilted structure body 50 is formed on the angle limiting filters 41 and 42 and has tilted faces having mutually different tilt angles in accordance with the transmission wavelengths of the optical band-pass filters 61 and 62. In particular, a plurality of tilted faces of a tilt angle $\theta 1$ with respect to the plane of the semiconductor substrate 10 is formed on the photodiode 31, and a plurality of tilted faces of a tilt angle $\theta 2$, which is different from $\theta 1$, is formed on the photodiode 32. As will be described later, the tilted structure body 50 is formed by processing an insulating film such as a film formed from $SiO_2$ through etching, CMP, a gray scale lithographic printing technique, or the like.

The optical band-pass filters 61 and 62 are formed by a multi-layer thin film 70 that is stacked on the tilted structure body 50. The transmission wavelength bands of the optical band-pass filters 61 and 62 are determined based on the tilt angles $\theta 1$ and $\theta 2$ of the tilted structure body 50 and the incidence light limitation angles (aspect ratio) of the angle limiting filters 41 and 42. For the configurations in which the transmission wavelength is changed in accordance with the tilt angle, the optical band-pass filters 61 and 62 are staked not through processes separated for each transmission wavelength but through the same multi-layer film forming process.

However, in a general optical sensor, there is a problem in that it is difficult to decrease the size. For example, in a spectroscopic sensor that acquires a continuous spectrum, since a prism and the like used for generating the continuous spectrum need to be arranged, or an optical path length needs to be acquired, the size of the device is increased. Accordingly, it is difficult to dispose a plurality of the sensors, constantly dispose the sensor in a test target object, and the like.

From this point, according to this embodiment, the light receiving element is formed by impurity regions 31 and 32 for photodiodes that are formed on the semiconductor substrate 10.

In addition, according to this embodiment, the angle limiting filters 41 and 42 are formed on the impurity regions 31 and 32 for photodiodes by using a light shielding material formed through a semiconductor process.

Accordingly, each constituent element of the optical sensor can be configured through the semiconductor process, and accordingly, the size of the optical sensor can be decreased. In other words, by forming the photodiodes 31 and 32 and the angle limiting filters 41 and 42 through the semiconductor process, fine processing can be performed in an easy manner, and the size can be decreased. In addition, compared to a case where members are configured by being bonded together, the selectivity of the transmission wavelength can be improved. In addition, compared to a case where an optical fiber is used as the angle limiting filter, a decrease in transmitted light due to a decrease in the limitation angle (the number of openings) is suppressed, whereby the selectivity of the wavelength can be improved.

Here, the semiconductor process is a process in which a transistor, a resistor, a capacitor, an insulating layer, a wiring layer, and the like are formed on a semiconductor substrate. For example, the semiconductor process is a process that includes an impurity introducing process, a thin-film forming process, a photolithographic process, an etching process, a planarization process, and a thermal process.

In addition, the light receiving areas of the photodiodes are areas located on the impurity regions 31 and 32 for photodiodes to which incidence light passing through the angle limiting filters 41 and 42 is incident. For example, in FIG. 9, the light receiving areas are areas corresponding to the openings of the angle limiting filters 41 and 42 having the lattice shape. Alternatively, in FIG. 10, the light receiving area is an area (for example, an area LRA) that is surrounded by a light shielding material that forms the angle limiting filters 41 and 42.

Furthermore, the light shielding material is a light absorbing material or a light reflecting material. The light absorbing material, for example, is tungsten, and the light reflecting material, for example, is aluminum.

In addition, the angle limiting filters 41 and are not limited to be closed along the outer circumference of the light receiving area but may have a non-continuous area along the outer circumference or be arranged intermittently along the outer circumference.

Figure 12:
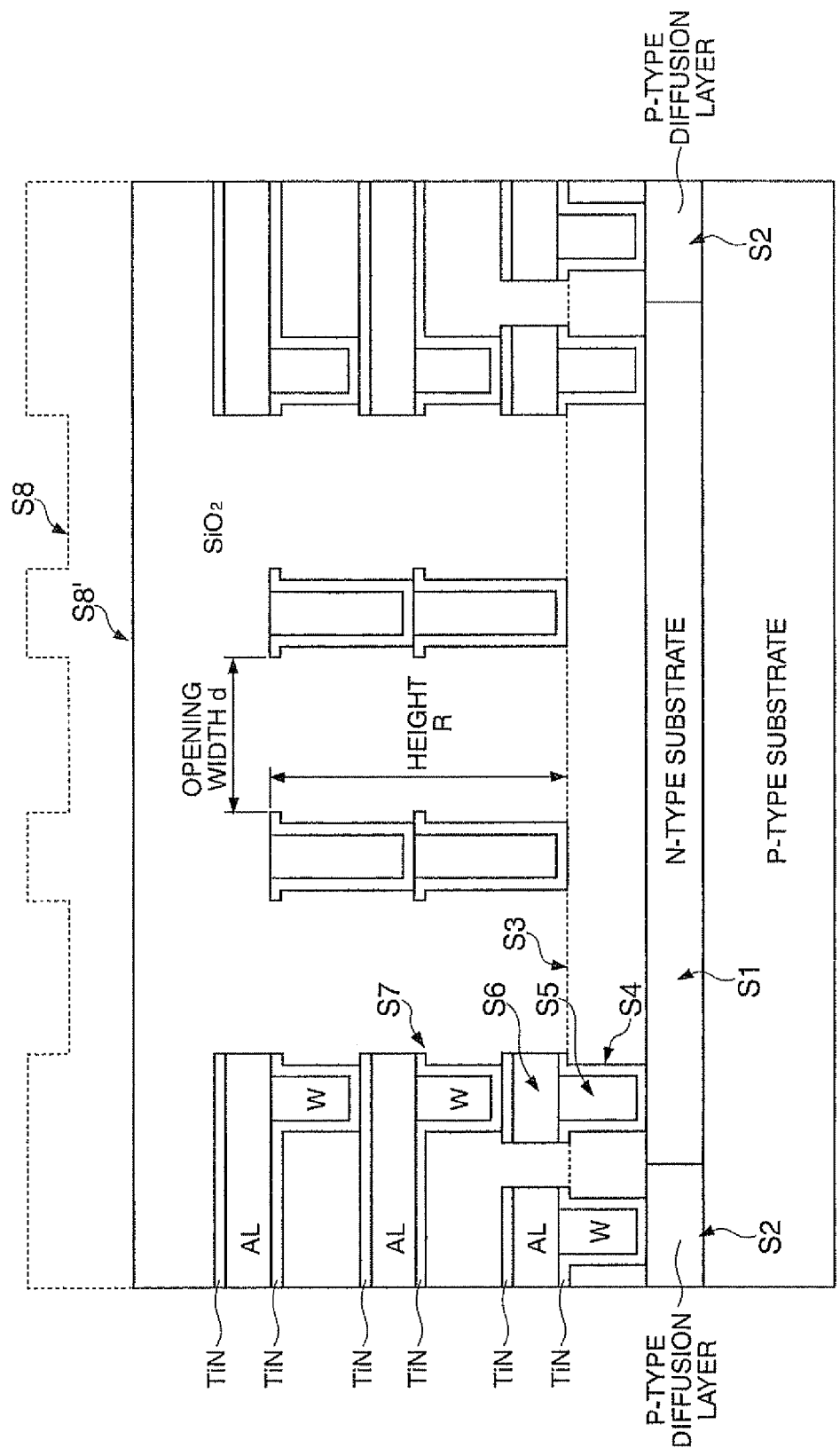
FIG. 12 is an example of a method of manufacturing an optical sensor.

Furthermore, in this embodiment, as shown in FIG. 12 to be described later, the angle limiting filters 41 and 42 are formed by conductive plugs of contact holes that are formed to be vacated in the insulating film stacked on the semiconductor substrate 10. In other words, the angle limiting filters 41 and 42 are formed only by conductive plugs such as tungsten plugs formed in an insulating film, which is formed from $SiO_2$ or the like, without using a metal wiring layer such as an aluminum wiring.

Accordingly, the angle limiting filters 41 and 42 can be formed by the conductive plugs. In particular, since the angle limiting filters 41 and 42 can be formed by tungsten plugs formed from a light absorbing material, the light shielding property can be improved.

Here, the contact hole is a contact hole vacated for a contact that is conductive between the wiring layer and the semiconductor substrate or a contact hole vacated for a via contact that is conductive between a wiring layer and another wiring layer.

In addition, the optical sensor according to this embodiment includes a processing circuit (the circuit 20 shown in FIG. 9) that processes an output signal of the light receiving element. The angle limiting filters 41 and 42 are formed through a wiring forming process in which the wiring of the processing circuit is formed. In particular, the angle limiting filters 41 and 42 are formed simultaneously with the formation of the wiring layer of the processing circuit and is formed through the whole or a part of the wiring layer forming process. For example, the angle limiting filters 41 and 42 are formed by insulating film formation through $SiO_2$ deposition, contact formation through tungsten deposition, and the like.

Accordingly, the angle limiting filters 41 and 42 can be formed on the impurity regions 31 and 32 for photodiodes through a semiconductor process. Therefore, it is not necessary to arrange a separate process for forming the angle limiting filters, and the angle limiting filters can be formed through a general semiconductor process.

In addition, on the same chip as that of the photodiodes 31 and 32, a processing circuit that processes output signals of the photodiodes 31 and 32 can be integrated. Accordingly, the size of the spectroscopic sensor can be further decreased.

In addition, the angle limiting filters 41 and 42 are not limited to aluminum wiring layers formed from a light reflecting material or tungsten contacts formed from a light absorbing material but may be a wiring layer formed from a light absorbing material or a contact formed from a light reflecting material. However, in a case where the angle limiting filters 41 and 42 are formed from a light absorbing material, the light shielding property is improved.

Furthermore, the angle limiting filters 41 and may be formed from an aluminum wiring layer or a tungsten contact to which a film formed from titanium nitride (TiN) or the like as a light absorbing material is added. Since the aluminum wiring layer is changed to absorb light, and the light absorbing property of titanium nitride (TiN) is higher than that of tungsten, the light absorbing property of the contact is improved. Accordingly, the light shielding property can be improved further.

In addition, in this embodiment, the angle limiting filters 41 and 42 may be formed from a conductive layer or a conductive plug formed through a semiconductor process and be electrodes to acquire signals from the impurity regions for photodiodes 31 and 32. For example, in a case where the impurity regions for the photodiodes 31 and 32 are P-type impurity regions, the angle limiting filters 41 and 42 that are conductive to the P-type impurity regions may also serve as anode electrodes of the photodiodes 31 and 32.

In such a case, the angle limiting filters 41 and 42 formed from a conductive layer or a conductive plug may be used as the electrodes of the photodiodes 31 and 32. Accordingly, electrodes do not need to be arranged in addition to the angle limiting filters 41 and 42, whereby a decrease in the amount of incidence light due to the electrodes can be avoided.

Furthermore, the optical sensor according to this embodiment includes the optical band-pass filters 61 and 62 that transmit light of a specific wavelength out of incidence light. For example, in this embodiment, the semiconductor substrate 10, the angle limiting filters 41 and 42, and the optical band-pass filters 61 and 62 are sequentially stacked in the mentioned order through semiconductor process.

Accordingly, light of a specific wavelength out of the incidence light can be allowed to be incident to the angle limiting filter 41 and 42 or the impurity regions for the photodiodes 31 and 32. In addition, as will be described with reference to FIG. 11A and the like, although the transmission wavelength of the optical band-pass filters 61 and 62 changes in accordance with the incidence angle, the transmission wavelength band can be limited by the angle limiting filters 41 and 42.

In addition, in this embodiment, the optical band-pass filter 61 and 62 are formed by multi-layer thin films that are tilted at angles $\theta 1$ and $\theta 2$ corresponding to the transmission wavelengths with respect to the semiconductor substrate 10. In particular, the optical band-pass filters 61 and 62 are formed by a plurality of sets of multi-layer thin films having mutually different transmission wavelengths. The plurality of sets of multi-layer thin films have tilt angles $\theta 1$ and $\theta 2$ with respect to the semiconductor substrate 10 that are different in correspondence with the transmission wavelengths and is formed through a simultaneous thin-film forming process. For example, as illustrated in FIG. 10, one set of multi-layer thin films is formed by continuously arranging a plurality of multi-layer thin films having a tilt angle of $\theta 1$. Alternatively, in a case where multi-layer thin films of mutually different tilt angles $\theta 1$ to $\theta 3$ are arranged so as to be adjacent to each other, and the multi-layer thin films of tilt angles $\theta 1$ to $\theta 3$ are repeatedly arranged, one set of multi-layer thin films may be formed by a plurality of multi-layer thin films of the same tilt angle.

In such a case, the optical band-pass filters 61 and 62 can be formed by the multi-layer thin-films titled at angles $\theta 1$ and $\theta 2$ corresponding to the transmission wavelengths. Accordingly, the multi-layer thin films of thicknesses corresponding to the transmission wavelengths do not need to be stacked in separate processes for the transmission wavelengths, whereby the process of forming the multi-layer thin films can be simplified.

Here, the simultaneous thin-film forming process represents not a process in which the same process in which, after a first set of multi-layer thin films is formed, a second set of multi-layer thin films is formed is sequentially repeated but a process in which a plurality of sets of multi-layer thin films is formed through the same (one) thin film forming process.

In addition, in this embodiment, the tilted structure body 50 that is disposed on the angle limiting filters 41 and 42 is included. The tilted structure body 50 includes tilted faces that are tilted at angles θ1 and θ2 corresponding to the transmission wavelengths of the optical band-pass filters 61 and 62 with respect to the semiconductor substrate 10, and multi-layer thin films are formed on the tilted faces.

Accordingly, by forming the multi-layer thin films on the tilted faces of the tilted structure body 50, the multi-layer thin films that are tilted at angles θ1 and θ2 corresponding to the transmission wavelengths of the optical band-pass filters 61 and 62 can be formed.

In addition, in this embodiment, the tilted structure body 50 is formed on the angle limiting filters 41 and 42 through a semiconductor process. For example, as will be described with reference to FIG. 13 and the like, in the tilted structure body 50, a level different or a density pattern is formed in a transparent film (insulating film) stacked through a semiconductor process, and the tilted structure body 50 is formed by either etching or grinding (for example, CMP) the level difference or the density pattern.

Accordingly, the tilted structure body can be formed through the semiconductor process. Therefore, the process of forming the tilted structure body can be simplified. In addition, compared to a case where the tilted structure body is configured as a separate member, the cost can be reduced. Furthermore, a decrease in the amount of light on a contact face that is in contact with the tilted structure body as a separate member can be avoided.

Here, a level difference in the insulating film, for example, is a height difference between the front face of the semiconductor substrate to the surface of the insulating film on the end face of the semiconductor substrate. In addition, the density pattern of the insulating film, for example, is a pattern of heights from the front face of the semiconductor substrate to the surface of the insulating film on the end face of the semiconductor substrate, and the density pattern of the insulating film is formed based on the ratio between high portions and low portions.

In addition, the tilted structure body 50 is not limited to being formed through grinding or etching of the level difference or the density pattern but may be formed by using a gray scale lithographic printing technique. According to the gray scale lithographic printing technique, a resist is exposed by using a gray scale mask having a density pattern, and etching is performed by using the exposed resist, whereby the titled structure body is formed.

6. Transmission Wavelength Band of Optical Band-Pass Filter

As described above, the transmission wavelength band of the optical band-pass filter is set based on the tilt angle of the multi-layer thin film and the limitation angle of the angle limiting filter. This point will be described in detail with reference to FIGS. 11A and 11B. For simplification of the description, hereinafter, a case will be described as an example in which the film thicknesses of the multi-layer thin films of the optical band-pass filters 61 and 62 are the same. However, in this embodiment, the film thicknesses of the multi-layer thin films of the optical band-pass filters 61 and 62 may be different from each other in correspondence with the tilt angles θ1 and θ2. For example, in the deposition of thin films, in a case where the thin films are grown in a direction perpendicular to the semiconductor substrate, the film thicknesses of the multi-layer thin films of the optical band-pass filters 61 and 62 may be configured to be in proportion to cos θ1 and cos θ2.

Figure 11A:
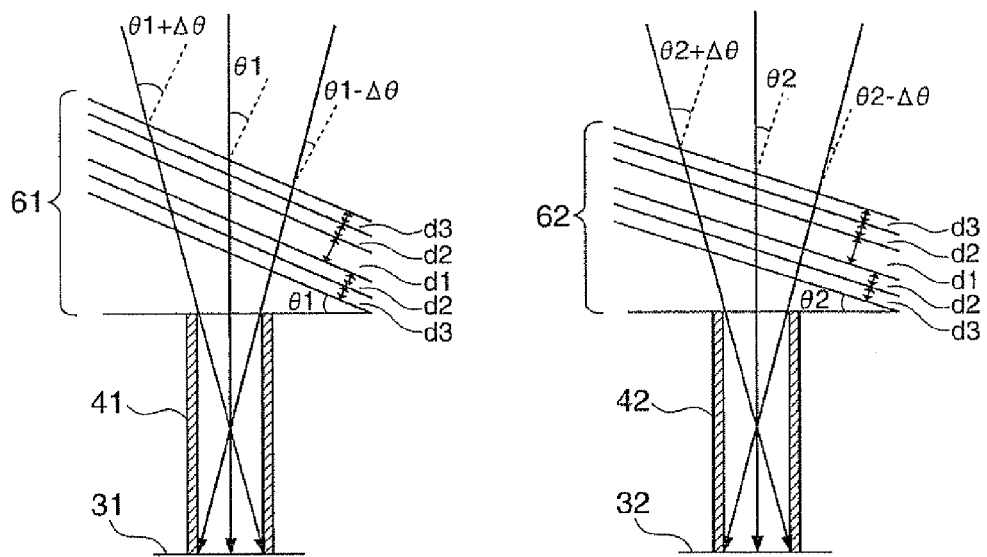
FIGS. 11A and 11B are schematic diagrams illustrating a transmission wavelength band of an optical band-pass filter.

As shown in FIG. 11A, the multi-layer thin films of the optical band-pass filters 61 and 62 are formed as thin films having a thickness d1 to d3 (here, d2<d1 and d3<d1). On the upper and lower sides of the thin film having a thickness d1, a plurality of layers of thin films having thicknesses d2 and d3 are alternately stacked. The thin film of the thickness d2 is formed from a material that has a refractive index different from those of the thin films of thicknesses d1 and d3. In addition, in FIG. 11A, although the number of layers of thin films of thicknesses d2 and d3 is omitted for simplification, actually, thin films of several tens or several hundreds of layers are stacked on the upper and lower sides of the thin film of the thickness d1. Furthermore, in FIG. 11A, although one layer of the thin film of the thickness d1 is configured for simplification, actually, a plurality of layers is formed in many cases.

Since the multi-layer thin film of the optical band-pass filter 61 has a tilt angle θ1 with respect to the light receiving face of the photodiode 31, a light beam perpendicular to the light receiving face is incident to the multi-layer thin film of the optical band-pass filter 61 at the angle θ1. When the limitation angle of the angle limiting filter 41 is denoted by Δθ, a light beam that is incident to the multi-layer thin film of the optical band-pass filter 61 at an angle θ1−θ0 to θ1+Δθ arrives at the light receiving face of the photodiode 31. Similarly, a light beam that is incident to the multi-layer thin film of the optical band-pass filter 62 at an angle θ2−Δθ to θ2+Δθ arrives at the light receiving face of the photodiode 32.

Figure 11B:
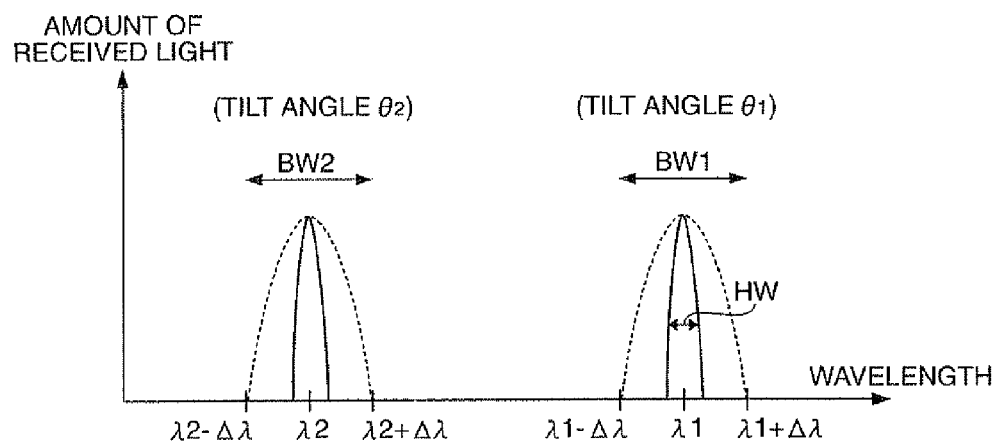

As shown in FIG. 11B, the transmission wavelength band BW1 of the optical band-pass filter 61 is $\lambda 1-\Delta\lambda$ to $\lambda 1+\Delta\lambda$. In such a case, the transmission wavelength $\lambda 1$ for the light beam having an incidence angle θ1 is $2\times n\times d1\times\cos\theta 1$. Here, n is the refractive index of the thin film of the thickness d1. In addition, $\lambda 1-\times\lambda=2\times n\times d1\times\cos(\theta 1+\Delta\theta)$, and $\lambda 1+\Delta\lambda=2\times n\times d1\times\cos(\theta 1\oplus\Delta\theta)$. A half-value width HW (for example, HW<BW1) of the transmission wavelength for the light beam having the incidence angle θ1 is determined based on the number of stacked layers of the multi-layer film. The amount of received light of the photodiode 31 is maximum at the incidence angle θ1 that is perpendicular to the light receiving face and is zero at the limitation angle. Accordingly, the amount of received light for the entire incidence light is represented by a curve denoted by a dotted line. Similarly, the transmission wavelength band BW2 of the optical band-pass filter 62 is $\lambda 2-\Delta\lambda$ to $\lambda 2+\Delta\lambda$. For example, in a case where θ2>θ1, $\lambda 2=2\times n\times d1\times\cos\theta 2<\lambda 1=2\times n\times d1\times\cos\theta 1$.

According to the above-described embodiment, the angle limiting filters 41 and 42 limit the ranges of changes in the transmission wavelengths to $\lambda 1-\Delta\lambda$ to $\lambda 1+\Delta\lambda$ and $\lambda 2-\Delta\lambda$ to $\lambda 2+\Delta\lambda$ by limiting the incidence angles of incident light to θ1−Δθ to θ1+Δθ and θ2−Δθ to θ2+Δθ. In the optical band-pass filter, the bands BW1 and BW2 of specific wavelengths for transmission are set based on the ranges of changes in the transmission wavelengths $\lambda 1-\Delta\lambda$ to $\lambda 1+\Delta\lambda$ and $\lambda 2-\Delta\lambda$ to $\lambda 2+\Delta\lambda$ that are limited by the angle limiting filters 41 and 42.

Accordingly, the transmission wavelength bands BW1 and BW2 of the optical band-pass filter are limited by the angle limiting filters 41 and 42, whereby only light of a wavelength band as a measurement target can be sensed. For example, the limitation angle of the angle limiting filters 41 and 42 is set as $\Delta\theta\leq 30°$. More preferably, the limitation angle of the angle limiting filters 41 and 42 is set as $\Delta\theta\leq 20°$.

7. Manufacturing Method

Hereinafter, an example of a method of manufacturing a spectroscopic sensor according to this embodiment in a case where the tilted structure body is formed through a semiconductor process will be described with reference to FIGS. 12 to 14.

First, as illustrated in S1 shown in FIG. 12, an N-type diffusion layer (impurity region of the photodiode) is formed on a P-type substrate by a photolithographic process, an ion injection process, and a photoresist peel-off process. As illustrated in S2, P-type diffusion layers are formed on the P-type substrate through a photolithographic process, an ion injection process, a photoresist peel-off process, and a thermal process. The N-type diffusion layer becomes the cathode of the photodiode, and the P-type diffusion layer (P-type substrate) becomes the anode thereof.

Next, as illustrated in S3, an insulating film is formed through a $SiO_2$ deposition process and a planarization process through CMP. As illustrated in S4, contact holes are formed through a photolithographic process, a $SiO_2$ anisotropic dry etching process, and a photoresist peel-off process. Then, as illustrated in S5, the contact holes are buried through a TiN sputtering process, a W (tungsten) deposition process, and a W etching back process. Thereafter, as illustrated in S6, a first AL wiring is formed through an AL (aluminum) sputtering process, a TiN sputtering process, a photolithographic process, an AL and TiN anisotropic dry etching process, and a photoresist peel-off process.

Next, as illustrated in S7, a via contact and a second AL wiring are formed through the same process as S3 to S6 described above. Then, the process of S7 is repeated a number of times as is necessary. FIG. 12 shows a case where up to a third AL wiring is formed. As illustrated in S8, an insulating film is formed by performing an $SiO_2$ deposition process. As illustrated in S8', a planarization process through CMP is performed. Through the wiring forming process described above, the AL wiring and the tungsten plug that configures the angle limiting filter are stacked.

Figure 13:
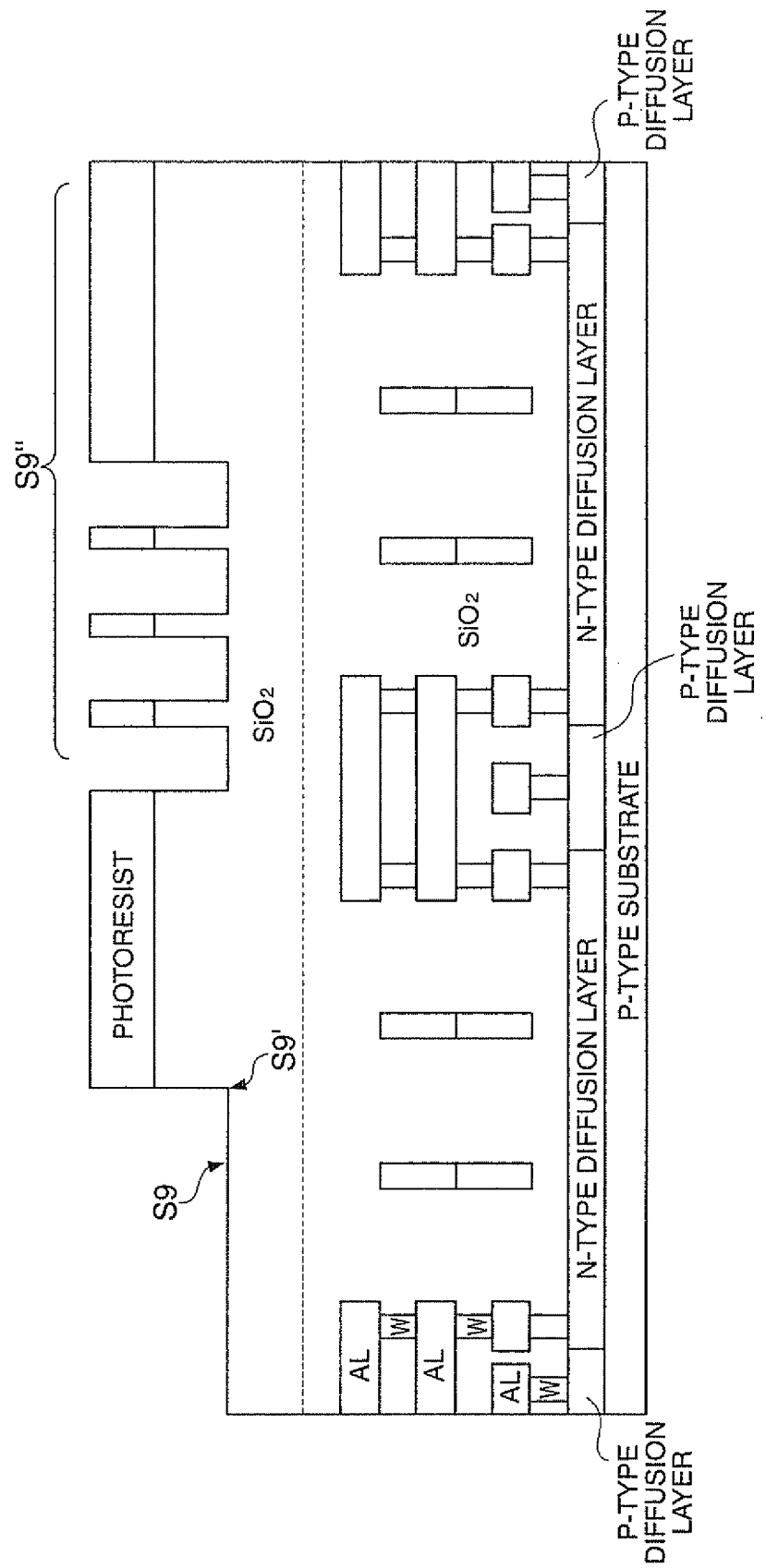
FIG. 13 is another example of a method of manufacturing an optical sensor.

Next, as illustrated in S9 shown in FIG. 13, a level difference (S9') or a density pattern (S9") of the insulating film is formed through an $SiO_2$ deposition process, a photolithographic process, an $SiO_2$ anisotropic dry etching, and a photoresist peel-off process.

Figure 14:
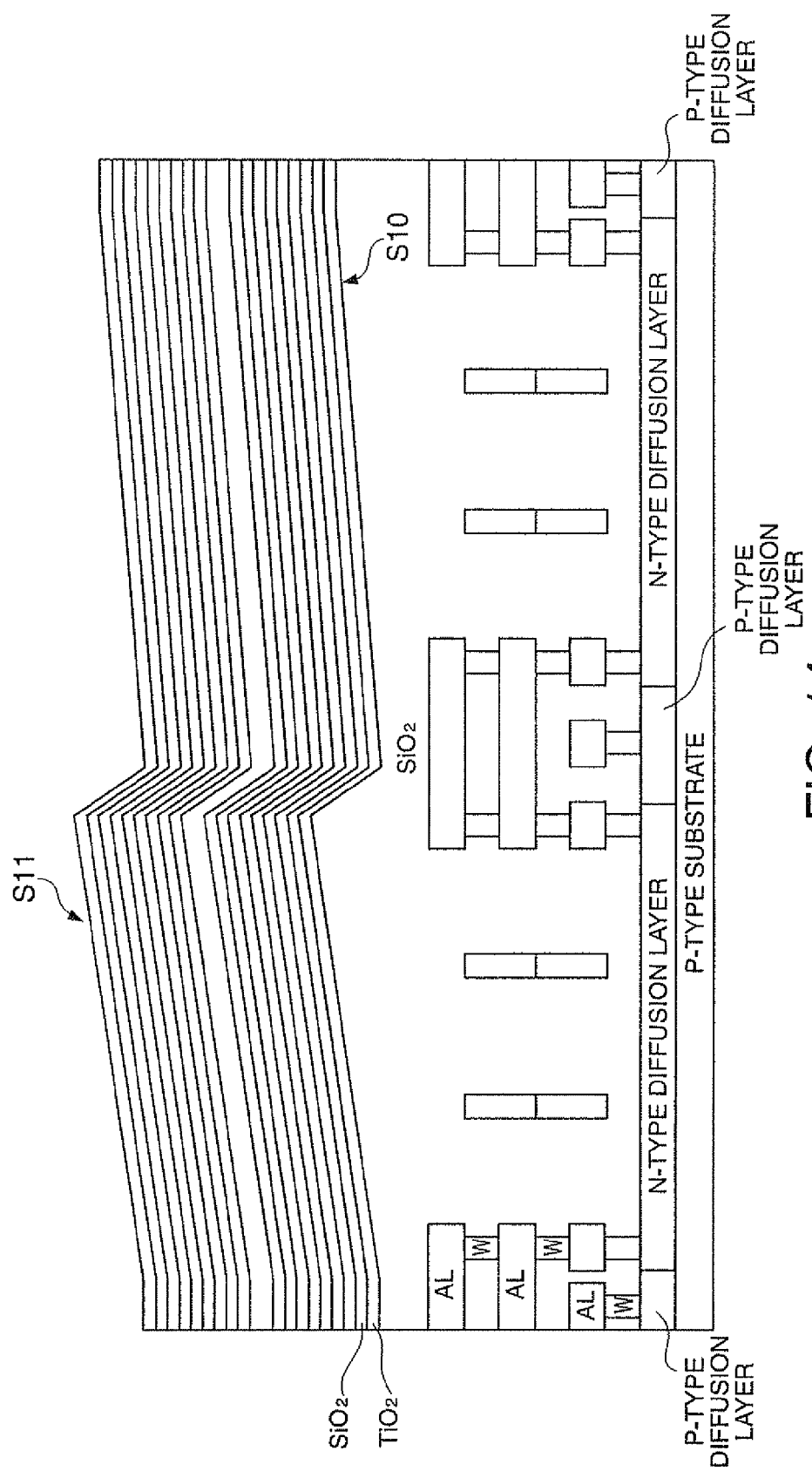
FIG. 14 is still another example of a method of manufacturing an optical sensor.

Next, as illustrated in S10 shown in FIG. 14, a tilted face of the tilted structure body is formed by performing a grinding process through CMP. At this time, the tilted face of the tilted structure body is processed at a tilt angle corresponding to the level difference or the density pattern of the insulating film.

Next, as illustrated in S11, a multi-layer thin film is formed on the tilted face by alternately performing a $TiO_2$ (titanium oxide film) sputtering process and an $SiO_2$ sputtering process. The $TiO_2$ film is a thin film having a high refractive index, and the $SiO_2$ film is a thin film having a low refractive index.

8. Modified Example of Manufacturing Method

A manufacturing method according to a first modified example in which the tilted structure body is formed as a separate member will be described with reference to FIG. 15.

Figure 15:
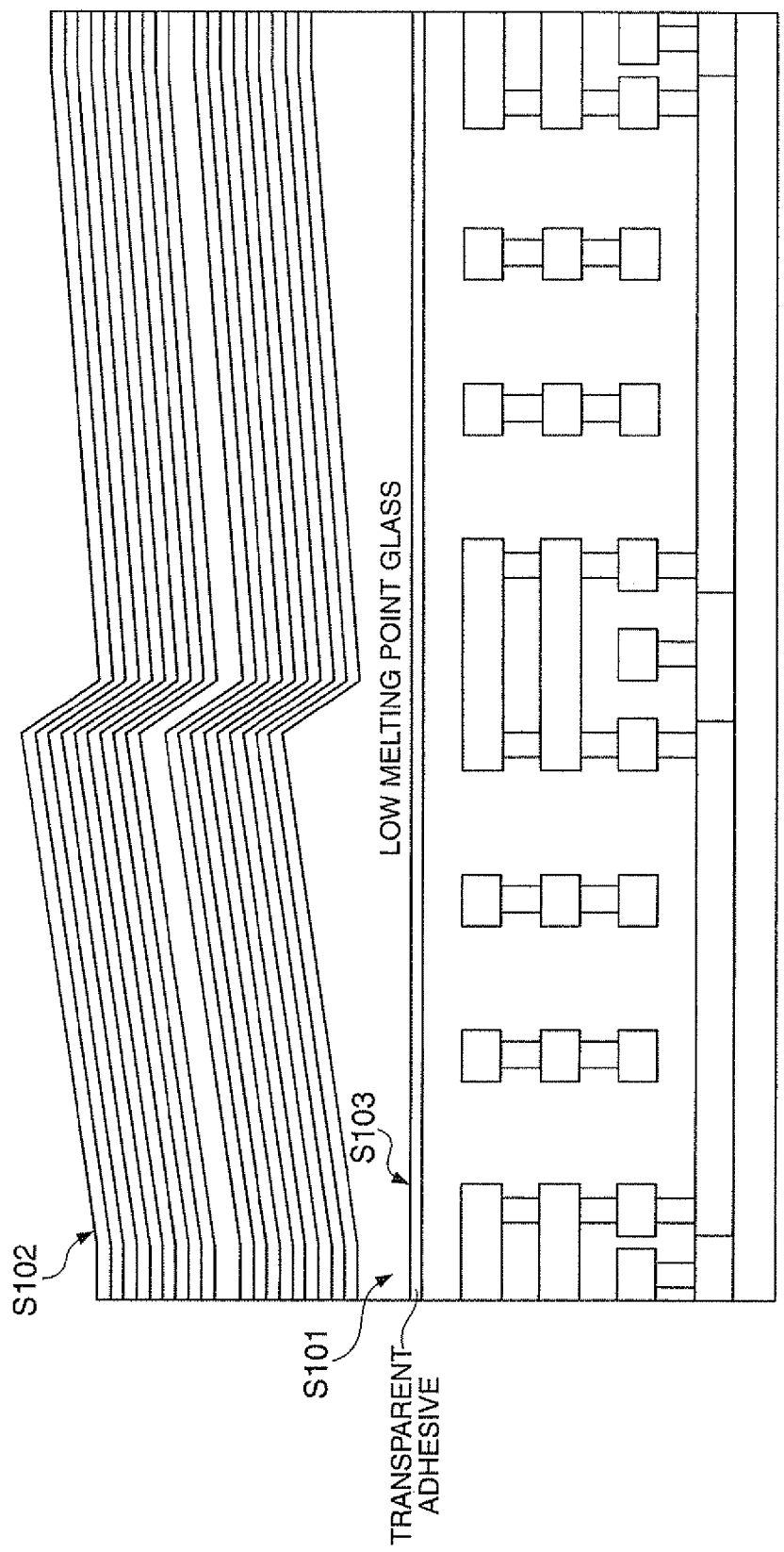
FIG. 15 is a modified example of a method of manufacturing an optical sensor.

First, as illustrated in S101 shown in FIG. 15, low melting point glass that is melt through heating is injected to a mold, and the low melting point glass is pressed to be molded by using the mold having a tilted face, whereby a tilted structure body is formed.

Next, as illustrated in S102, a multi-layer thin film is formed on the tilted structure body formed from low melting point glass by alternately performing a $TiO_2$ sputtering process and an $SiO_2$ sputtering process.

Next, as illustrated in S103, the tilted structure body in which the multi-layer thin film is formed is bonded to an insulating layer of the angle limiting filter by using an adhesive (an adhesive that is transparent for a wavelength as a spectroscopic target). In addition, the photodiodes and the angle limiting filters are formed through the process of S1 to S8 described above with reference to FIG. 12.

9. Electronic Apparatus

Figure 16:
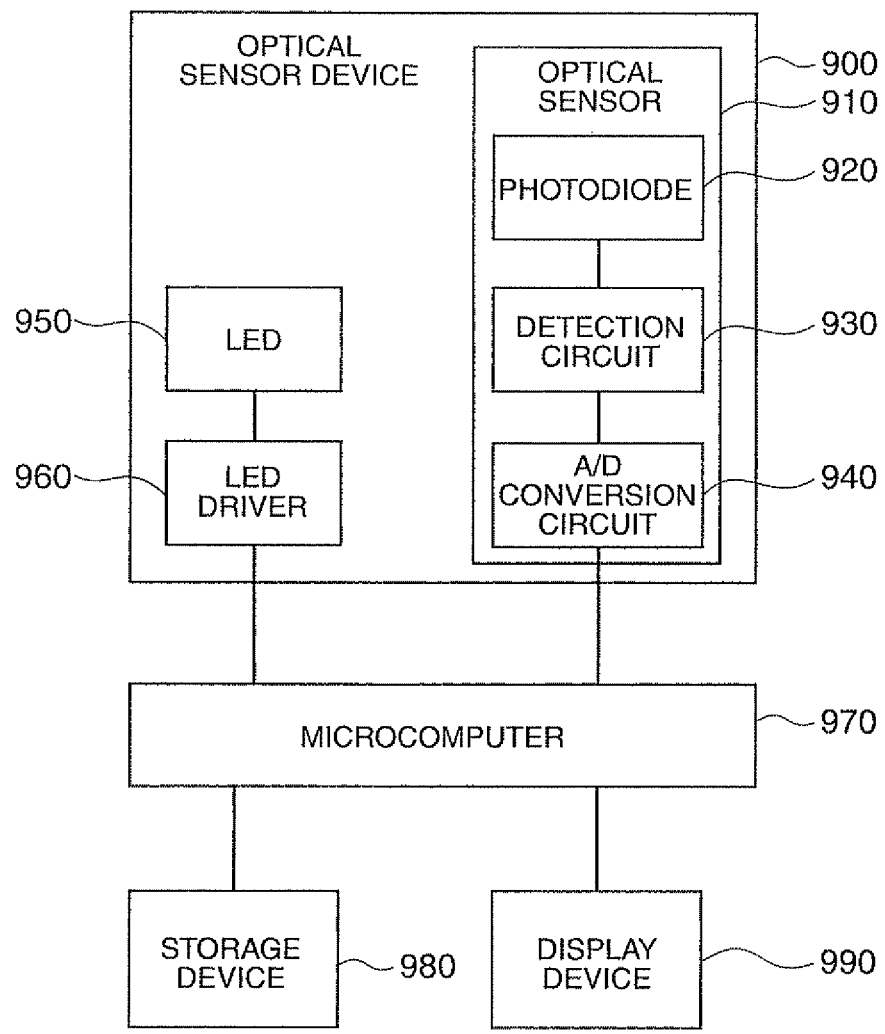
FIG. 16 is a configuration example of an electronic apparatus.

FIG. 16 shows a configuration example of an electronic apparatus that includes the optical sensor according to this embodiment. As examples of the electronic apparatus, there are a pulsimeter, a pulse oximeter, a blood glucose meter, and a saccharimeter. In addition, this embodiment is not limited to the configuration shown in FIG. 16 and, for example, may be used in an elevation angle measuring device, an illuminometer, or the like by omitting the LED 950.

The electronic apparatus shown in FIG. 16 includes an optical sensor device 900, a microcomputer 970 (CPU), a storage device 980, and a display device 990. The optical sensor device 900 includes an LED 950 (light source), an LED driver 960, and an optical sensor 910. The optical sensor 910, for example, is integrated in a one-chip IC and includes a photodiode 920, a detection circuit 930, and an A/D conversion circuit 940.

The LED 950, for example, emits white light onto an observation target. The optical sensor device 900 acquires signals of each wavelength by spectrally dispersing reflection light or transmission light supplied from the observation target. The microcomputer 970 controls the LED driver 960 and acquires signals from the optical sensor 910. The microcomputer 970 displays a display that is based on the acquired signal on the display device 990 (for example, a liquid crystal display device) or stores data that is based on the acquired signal in the storage device 980 (for example a memory or a magnetic disk).

As above, although the embodiments have been described in detail, it can be easily understood by those skilled in the art that many modifications can be made which are not substantially deviated from the new matters and the advantages of the invention. Accordingly, such modified examples belong to the scope of the invention. For example, a term that is described at least once together with another term that has a broad meaning or the same meaning in the descriptions presented here or the figures may be substituted with the another term in any place in the descriptions presented here and the figures. In addition, the configurations and the operations of the optical sensor, the electronic apparatus, and the like are not limited to those described in the embodiment, and various changes can be made therein.

What is claimed is:

1. An optical sensor comprising:
    a light receiving element; and
    an angle limiting filter that limits an incidence angle of incidence light with respect to a light receiving area of the light receiving element,
    wherein, a wavelength of the incidence light is denoted by λ, a height of the angle limiting filter is denoted by R, and a width of an opening of the angle limiting filter is denoted by d, "$d^2/(\lambda R) \geq 2$" is satisfied, and wherein the wavelength of the incidence light λ is between 0.5 μm and 0.9 μm.

2. The optical sensor according to claim 1,
    wherein the angle limiting filter satisfies "$\tan^{-1}(d/R) < 60°$".

3. An electronic apparatus comprising:
    the optical sensor according to claim 2.

4. The optical sensor according to claim 1,
wherein the light receiving element is formed by an impurity region, which is formed on a semiconductor substrate, for a photodiode.

5. The optical sensor according to claim 4,
wherein the angle limiting filter is formed from a light shielding material that is formed on the impurity region for the photodiode through a semiconductor process.

6. An electronic apparatus comprising:
the optical sensor according to claim 5.

7. The optical sensor according to claim 4,
wherein the angle limiting filter is formed by a conductive plug of a contact hole vacated in an insulating film that is stacked on the semiconductor substrate.

8. An electronic apparatus comprising:
the optical sensor according to claim 7.

9. An electronic apparatus comprising:
the optical sensor according to claim 4.

10. The optical sensor according to claim 1, further comprising a processing circuit that processes an output signal of the light receiving element,
wherein the angle limiting filter is formed through a wiring forming process in which a wiring of the processing circuit is formed.

11. The optical sensor according to claim 1, further comprising an optical band-pass filter that transmits light of a specific wavelength out of the incidence light.

12. The optical sensor according to claim 11,
wherein the optical band-pass filter is formed by a multi-layer thin film that is tilted with respect to a light receiving face of the light receiving element at an angle corresponding to a transmission wavelength.

13. The optical sensor according to claim 12,
wherein the optical band-pass filter is formed by a plurality of sets of multi-layer thin films having mutually different transmission wavelengths, and
wherein the plurality of sets of multi-layer thin films has mutually different tilt angles with respect to the light receiving face in accordance with the transmission wavelengths and is formed through a simultaneous thin-film forming process.

14. The optical sensor according to claim 1,
wherein, when an arrival ratio characteristic of the incident light that passes through the angle limiting filter and arrives at the light receiving area has a first characteristic region in which a slope of the arrival ratio characteristic with respect to the width of the opening is a first slope and a second characteristic region in which a slope of the arrival ratio characteristic with respect to the width of the opening is a second slope that is lower than the first slope, the opening is formed such that the width of the opening is equal to or larger than the width of the opening at a change point at which the arrival ratio characteristic changes from the first slope to the second slope.

15. The optical sensor according to claim 1,
wherein the optical sensor is a spectroscopic sensor that is used for spectrally dispersing the incidence light.

16. The optical sensor according to claim 1,
wherein the optical sensor is an illuminance sensor that is used for measuring illuminance of the incidence light.

17. The optical sensor according to claim 1,
wherein the optical sensor is an elevation angle sensor that is used for measuring an elevation angle of a light source.

18. An electronic apparatus comprising:
the optical sensor according to claim 1.

19. An optical sensor comprising:
an angle limiting filter that limits an incidence angle of incidence light with respect to a light receiving area of a light receiving element,
wherein, a wavelength of the incidence light is denoted by $\lambda$, a height of the angle limiting filter is denoted by R, and a width of an opening of the angle limiting filter is denoted by d, "$d^2/(\lambda R) \geq 2$" is satisfied and wherein the wavelength of the incidence light $\lambda$ is between 0.5 μm and 0.9 μm.

20. An optical sensor comprising:
a light receiving element; and
an angle limiting filter that limits an incidence angle of incidence light with respect to a light receiving area of the light receiving element, wherein, the opening is formed such that the width of the opening is equal to or larger than the width of the opening at a change point at which an arrival ratio characteristic changes from a first slope to a second slope, the arrival ratio characteristic being an arrival ratio characteristic of the incident light that passes through the angle limiting filter and arrives at the light receiving area having a first characteristic region in which a slope of the arrival ratio characteristic with respect to the width of the opening is the first slope and a second characteristic region in which a slope of the arrival ratio characteristic with respect to the width of the opening is the second slope, and the second slope is lower than the first slope.

* * * * *